US006950394B1

(12) United States Patent
Chou et al.

(10) Patent No.: US 6,950,394 B1
(45) Date of Patent: Sep. 27, 2005

(54) METHODS AND SYSTEMS TO TRANSFER INFORMATION USING AN ALTERNATIVE ROUTING ASSOCIATED WITH A COMMUNICATION NETWORK

(75) Inventors: Norman Cho-Chun Chou, San Jose, CA (US); Ian G. Colloff, Los Gatos, CA (US); Laura Sennett, Ft. Collins, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 821 days.

(21) Appl. No.: 09/948,460

(22) Filed: Sep. 7, 2001

(51) Int. Cl.⁷ .......................... G01R 31/08; H04L 12/28
(52) U.S. Cl. ....................... 370/229; 370/401; 709/238; 710/316
(58) Field of Search ............................... 370/230, 401, 370/351, 389, 229, 390; 710/100, 316; 709/221, 238

(56) References Cited

U.S. PATENT DOCUMENTS

| 5,615,161 | A |   | 3/1997  | Mu           |        |
|-----------|---|---|---------|--------------|--------|
| 5,644,604 | A |   | 7/1997  | Larson       |        |
| 5,740,346 | A |   | 4/1998  | Wicki et al. |        |
| 5,768,300 | A |   | 6/1998  | Sastry et al.|        |
| 5,838,684 | A |   | 11/1998 | Wicki et al. |        |
| 5,892,766 | A |   | 4/1999  | Wicki et al. |        |
| 5,931,967 | A |   | 8/1999  | Shimizu      |        |
| 5,959,995 | A |   | 9/1999  | Wicki et al. |        |
| 5,987,629 | A |   | 11/1999 | Sastry et al.|        |
| 5,991,296 | A |   | 11/1999 | Mu et al.    |        |
| 6,003,064 | A |   | 12/1999 | Wicki et al. |        |
| 6,496,940 | B1| * | 12/2002 | Horst et al. | 714/4  |
| 6,748,559 | B1| * | 6/2004  | Pfister et al.| 714/56|
| 6,839,346 | B1| * | 1/2005  | Kametani     | 370/389|

OTHER PUBLICATIONS

"InfiniBand Switch Chip Runs at 10 Gbps On Eight Ports", Nicholas Cravotta, Nov. 8, 2001, EDN, 1 page.
"Assemble Fast Switch Fabrics With 32–Port InfiniBand Node p. 60", Electronic Design, Oct. 15, 2001, 4 pages.
"RedSwitch, Inc. Announces Industry's Highest Performance and Highest Integration InfiniBand Switch Chip", RedSwitch Press Release, Oct. 16, 2001, 2 pages.
"RedSwitch Gearing Up To Launch New Chip", Steve Tanner, Silicon Valley Business Ink, Oct. 26, 2001, 3 pages.
"Mellanox Integrates Serdes Into Infiniband Switch", Jerry Ascierto, EE Times, Oct. 23, 2001, 3 pages.
"Switch Chip Expands InfiniBand Integration", EEM File 3130, Tony Chance, 2 pages.
"RedSwitch Announces 16 Gbyte/s Throughout Switch Product for RapidIO Architecture", RedSwitch Press Release, Milpitas, Calif., May 15, 2001, Tony Chance,May 15, 2001 , 2 pages.
"RedSwitch and Agilent Technologies Unveil 160–GB/s Throughout Switch Product for InfiniBand Architecture", RedSwitch Press Release, Intel Developer Forum Conference, San Jose, Calif., Feb. 27, 2001, Mark Alden–Agilent, Tony Chance–RedSwitch, 2 pages.
InfiniBand™ Architecture Specification vol. 1, Release 1.0; Oct. 24, 2000; (880 pages).

* cited by examiner

Primary Examiner—Duc Ho

(57) ABSTRACT

A method of facilitating data transfers through a communication network. The method includes forwarding a first data set received from a first interconnect device to a processor. The first data set has transfer instructions and routing instructions associated therewith. The routing instructions specify a destination for the first data set. The method further includes extracting the transfer instructions at the processor and generating a first routing request for the first data set according to the transfer instructions to transfer the first data set to a second interconnect device. The second interconnect device is capable of routing the first data set to the destination. The first routing request has no association to the routing instructions.

76 Claims, 14 Drawing Sheets

METHODS AND SYSTEMS TO TRANSFER INFORMATION USING AN ALTERNATIVE ROUTING ASSOCIATED WITH A COMMUNICATION NETWORK

FIELD OF THE INVENTION

The present invention relates generally to the field of data communications and, more specifically, to data transfer mechanism, for example, data transfer from one interconnect device to a destination in a communications network.

BACKGROUND OF INVENTION

Existing networking and interconnect technologies have failed to keep pace with the development of computer systems, resulting in increased burdens being imposed upon data servers, application processing and enterprise computing. This problem has been exasperated by the popular success of the Internet. A number of computing technologies implemented to meet computing demands (e.g., clustering, fail-safe and 24×7 availability) require increased capacity to move data between processing nodes (e.g., servers), as well as within a processing node between, for example, a Central Processing Unit (CPU) and Input/Output (I/SO) devices.

With a view to meeting the above described challenges, a new interconnect technology, called the InfiniBand™, has been proposed for interconnecting processing nodes and I/O nodes to form a System Area Network (SAN). This architecture has been designed to be independent of a host Operating System (OS) and processor platform. The InfiniBand™ Architecture (IBA) is centered around a point-to-point, switch fabric whereby end node devices (e.g., inexpensive I/O devices such as a single chip SCSI or Ethernet adapter, or a complex computer system) may be interconnected utilizing a cascade of switch devices. The InfiniBand™ Architecture is defined in the InfiniBand™ Architecture Specification Volume 1, Release 1.0, released Oct. 24, 2000 by the InfiniBand™ Trade Association. The IBA supports a range of applications ranging from back plane interconnects of a single host, to complex system area networks, as illustrated in FIG. 1A (prior art). In a single host environment, each IBA switch fabric may serve as a private I/O interconnect for the host providing connectivity between a CPU and a number of I/O modules. When deployed to support a complex system area network, multiple IBA switch fabrics may be utilized to interconnect numerous hosts and various I/O units.

Within a switch fabric supporting a System Area Network, such as that shown in FIG. 1A, there may be a number of devices having multiple input and output ports through which data (e.g., packets) is directed from a source to a destination or target. Such devices include, for example, switches, routers, repeaters and adapters (exemplary interconnect devices). Where data is processed through a device, it will be appreciated that multiple data transmission requests may compete for resources of the device. For example, where a switching device has multiple input ports and output ports coupled by a crossbar, packets received at multiple input ports of the switching device, and requiring direction to specific outputs ports of the switching device, compete for at least input, output and crossbar resources.

In order to facilitate multiple demands on device resources, an arbitration scheme is typically employed to arbitrate between competing requests for device resources. Such an arbitration schemes may typically be either (1) a distributed arbitration scheme, whereby the arbitration process is distributed among multiple nodes, associated with respective resources, through the device or (2) a centralized arbitration scheme whereby arbitration requests for all resources is handled at a central arbiter. An arbitration scheme may further employ one of a number of arbitration policies, including a round robin policy, a first-come-first-serve policy, a shortest message first policy or a priority based policy, to name but a few.

The physical properties of the IBA interconnect technology have been designed to support both module-to-module (board) interconnects (e.g., computer systems that support I/O module add in slots), chassis-to-chassis interconnects, as to provide to interconnect computer systems, external storage systems, and external LAN/WAN access devices. For example, an IBA switch may be employed as interconnect technology within the chassis of a computer system to facilitate communications between devices that constitute the computer system. Similarly, an IBA switched fabric may be employed within a switch, or router, to facilitate network communications between network systems (e.g., processor nodes, storage subsystems, etc.). To this end, FIG. 1A illustrates an exemplary System Area Network (SAN), as provided in the InfiniBand™ Architecture Specification, showing the interconnection of processor nodes and I/O nodes utilizing the IBA switch fabric.

In a network communication scheme (e.g., IBA switch fabric) there are typically multiple targets or destinations that request for information, data, or instructions that are transferred in some kind of format, (e.g., packets) from sources to these targets or destinations. A destination could be an ordinary client machine that is an I/O controller connected to the communication network. The destination may have several addresses, for examples, local identifiers (LIDs) that are dedicated to receiving packets within the network communication. In this scheme, a source may be a server, also connected to the communication network.

It is well understood that there are many destinations requesting information from servers, and many servers responding to different destinations at any one time in the communication network The shifting of information around, from one place to another, almost always occurs simultaneously within the switch fabric. The requests for information occur in any direction from any destination to any server and vice versa. For instance, when the server receives the request for a particular information from the requested destination, it presents a request to an arbiter in the communication network practicing the arbitration scheme mentioned above to request access to certain ports so that it can route the information to the requested destination. The requested destination may have more than one LIDs through which packets can be directed (as can be seen in FIG. 1B (prior art)). For instance, a destination 2 in the network communication has been assigned with four (4) LIDs, $LID_8$, $LID_9$, $LID_{10}$, and $LID_{11}$, (i.e., four paths through which data can be routed to the destination 2, $P_8$, $P_9$, $P_{10}$, and $P_{11}$,). Similarly, a destination 1 has been assigned with four LIDs, $LID_1$, $LID_2$, $LID_3$, and $LID_4$ (i.e., four paths through which data can be routed to the destination 1, $P_1$, $P_2$, $P_3$, and $P_4$,).

Returning to FIG. 1A, as can be imagined, traffic and congestion in the ports, especially as the Internet grows more and more crowded everyday, are inevitable. For instance, there may be multiple servers and destinations wanting to go through the same ports to get information to some destinations or destinations. Hot spots, or congestions in the ports, are thus even more typical with the expansion of the Internet. Alternative routing of the packets has been practiced in the field as one way to alleviate the congested port problem. Conventional alternative routing may be thought of as routing the data through different ports, the ports that are available. The IBA itself provides one way to do it.

For example, a destination can have two LIDs assigned to it as shown in FIG. 1A. Each LID is recorded in a routing table in a switch in the IBA's switch fabric, which enables the determination of the port through which the data can be routed for these LDs. When there is alternative routing, it is purely a concept between the source and the destination. In this example, the network is configured with multiple routing paths for any particular destination. There are thus more than one paths to get to the destination. (e.g., paths $P_1$, $P_2$, $P_3$ and $P_4$, for the destination 1). When there are failed links in the switch fabric, (e.g., $P_3$ is congested or disabled), the server can route the packet through the other alternative paths (e.g., paths $P_1$, $P_2$, or $P_4$,) to get the data to the destination 1.

In another example, a Sub-Network manager or the manager for the switch fabric can reload the routing table in the affected area of the network. For instance, when the switch 4 is disabled for some reason, the Sub-Network manager can reload the routing table F-5 in the switch 5 to include LID 13. The packet can then be routed to the destination 1 via the switch 5.

However, as seen, in order for packets to be transferred at all, the LIDs in the packets must match with at least one of the LIDs in the routing table of a switch. The alternative routing of the current art is simply a mechanism such that the routing path for data transfers in the communication network will be chosen through the paths that are available and less congested. However, only those switches that have the LIDs for the destination can participate in this alternative routing mechanism When all of those switches are unavailable, there will be delay in the routing. If the Sub-Network manager does not reestablish a new passage to the destination node by reprogramming some of the routing tables in the switch fabric, there could even be permanent blockage of the access to the destination node in every possible routing path.

SUMMARY OF THE INVENTION

According to a first aspect of the present invention, there are provided methods, systems, and apparatuses to transfer information using alternative routing associated with a communication network.

In one exemplary embodiment, a method to facility data transfer through a communication network includes forwarding a first data set received from a first interconnect device to a processor. The first data set has transfer instructions and routing instructions associated therewith. The routing instructions specify a destination for the first data set. The method further includes extracting the transfer instructions at the processor and generating a first routing request for the first data set according to the transfer instructions to transfer the first data set to a second interconnect device. The second interconnect device is capable of routing the first data set to the destination. The first routing request has no association to the routing instructions.

The apparatuses for transferring information using alternative routing associated with a communication network are also disclosed below.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1A:
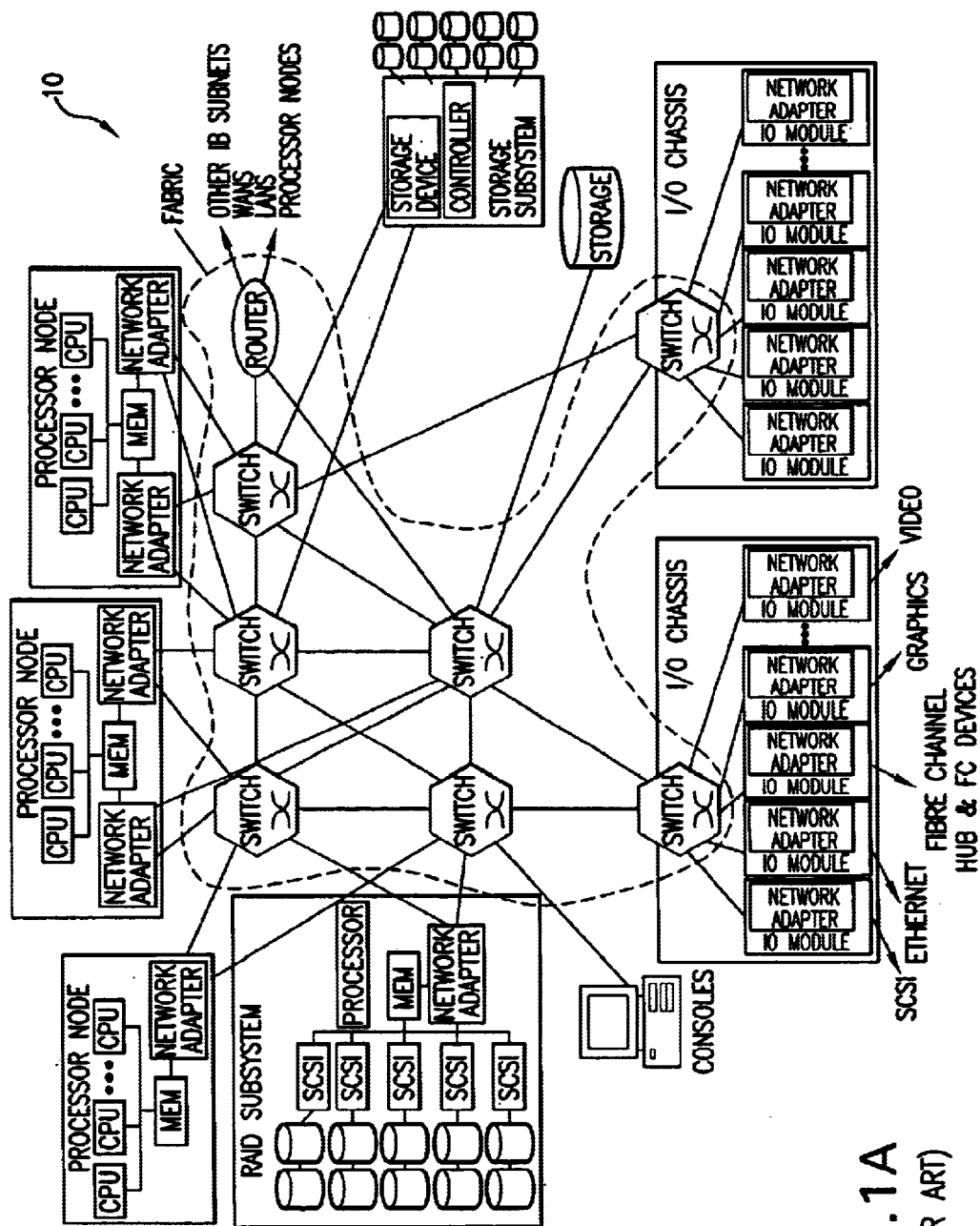
FIG. 1A illustrates an exemplary diagrammatic representation of a System Area Network, according to the prior art, as supported by a switch fabric.

A method and system to transfer information using alternative routing associated with a communication network are described. In the following description, for purposes of explanation, numerous specific details are set forth in order to provide a thorough understanding of the present invention. It will be evident, however, to one skilled in the art that the present invention may be practiced without these specific details.

For the purposes of the present invention, a communication network allows many devices to concurrently communicate in a managed environment. The term "communication network" shall be taken to include at least several interconnect devices connected to one another via a plurality of links. In one embodiment, a communication network shall have a first interconnect device coupled to at least another interconnect device. The terms "interconnect device," "first interconnect device," "second interconnect device" and any other interconnect devices for that matter, shall be taken to include chips, (e.g., ASIC chips), switches, routers, repeaters, adapters, channel adapters, or any other devices that provide interconnect functionality between nodes. The concept of a node is well known in the field. For example, a node can be a network junction or connection point in the network communication. Such interconnect functionality may be, for example, module-to-module or chassis-to-chassis interconnect functionality. The term "links" shall be taken to include a connector that interconnect adapters, switches, repeaters, or interconnect devices to form a communication network (e.g., fabric). A link may, for example, be a copper cable, an optical cable, or printed circuit wiring on a backplane.

While an exemplary embodiment of the present invention is described below as being implemented within a switch deployed within an InfiniBand™ architecture system, the teachings of the present invention may be applied to any interconnect device within any interconnect architecture.

Addresses

A device that requests or receives data can be referred to as a destination. A device that sends data can be referred to as a source, host, or server. A hosting device or a host is a device that is capable of running certain software layers on it. It is coupled to the fabric through one or more host network adapters. A server could be one of the examples. A targeting device or a destination is a device that is not capable of running certain layers of the software layers. It is coupled to the fabric through one or more destination network adapters. A storage subsystem could be one of the examples. Both a host and a target can be the source or the destination of a network transaction The destination receives data through some specified addresses. As the communication network is first configured, each destination would be assigned some unique local identifiers (LIDs) and these LIDs are the addresses of the particular destination. Each of these LIDs specifies a particular routing path that data can be sent through to get to the destination. When the data is being transferred to the destination, a destination LID (DLID) would be specified in the data packet so that an interconnect device can route the data packet to the destination using a routing path associated with each DLID. This DLID can be found in a routing (forwarding) table included in the interconnect device that is used to route the data. The routing path also includes communication port information (or communication port identification) that will allow the data packet to be transferred through a correct communication port. This is also referred to as routing path identification in this document.

Datapath

In a communication network, data is often shifted from one place to another. An example of a communication network of the present invention can be the IBA described in FIGS. 1A and a communication network 100 in FIG. 1C. The communication network 100, for example, connects multiple independent processor platforms such as interconnect devices together. The communication network 100 of the present invention can also be subdivided in the Sub-Networks, (e.g., Sub-Networks 101–104), interconnected by connectors or routers, (e.g., routers 105 and 106), as shown in FIG. 1C. As illustrated there, one Sub-Network can connect to other Sub-Network via connectors (sometime referred to as routers) and this could also form different conceptual layers of the communication network 100. Each Sub-Network may comprises several interconnect devices, such as, end nodes 108, switches 109, routers 110, and Sub-Network managers (e.g., Sub-Network manager 107) interconnected by links 111. (See FIG. 1C).

Figure 2A:
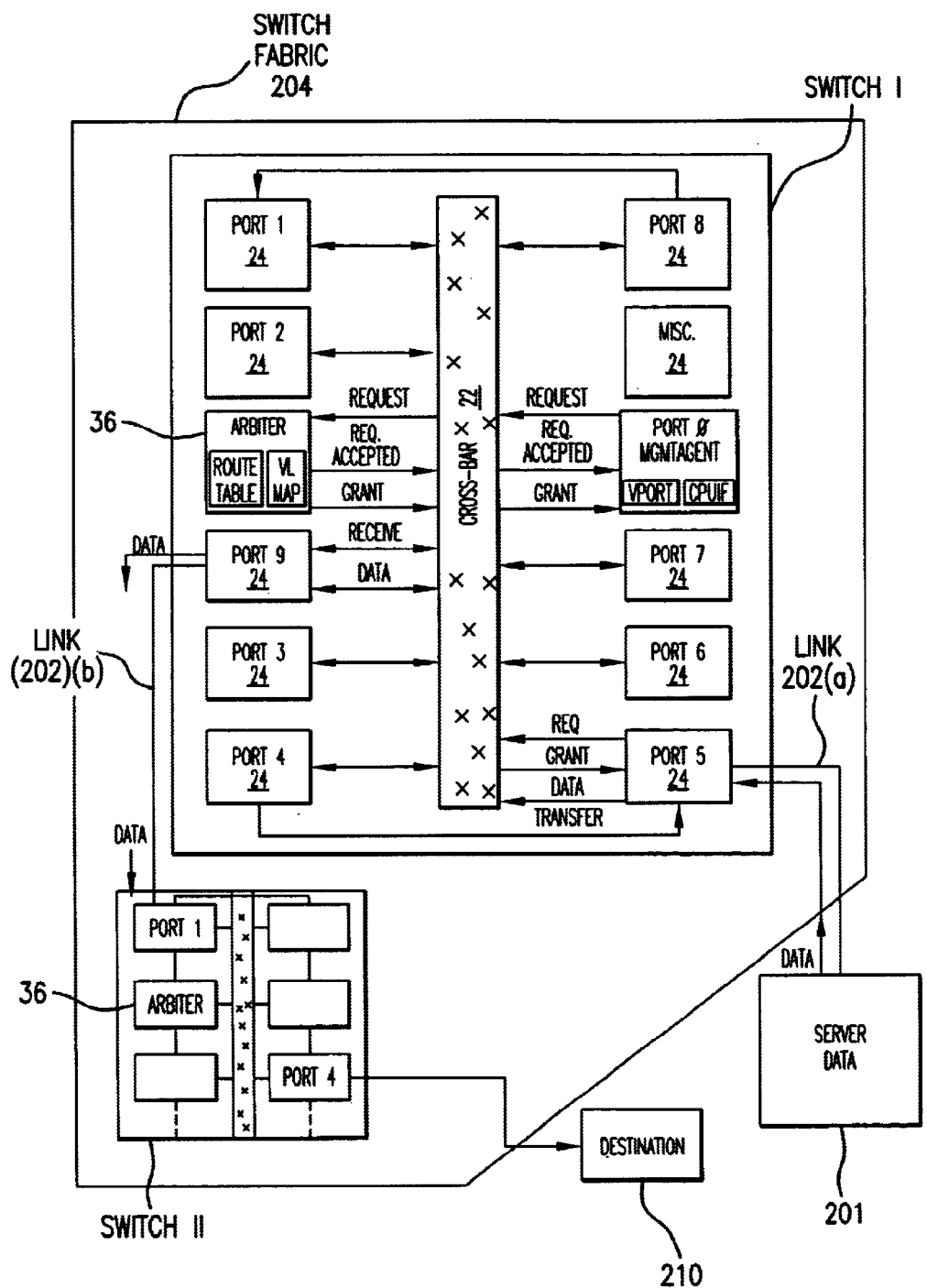
FIG. 2A illustrates an exemplary embodiment of the present invention wherein data is transferred over a communication network using a manager residing on a microprocessor that interconnect to an interconnect device.

Data is shifted from a source to a destination, and from one interconnect device to another interconnect device via links and communication ports. FIG. 2A illustrates a section of a communication network. This figure shows that a piece of data can be shifted from a server 201 via link 202(a) to a communication port 5 of the switch 1. In one embodiment, each of the switches in a switch fabric comprises several communication ports (e.g., port 1, port 2, port 3, port 4, port 5, port 5, port 7, and port 8). Each of the communication ports is configured to send or receive data, transfer data and issue request to transfer data to some other ports, and ultimately, to exit or enter some other switches, and finally, from the server (e.g., server 201) to the destination (e.g., destination 210). Each of the switches also includes an arbiter 36 to control traffic flow of the data from one communication port to another. (See below).

In one embodiment, a data set, for example, in the form of a packet, is typically exchanged over the communication network such as the switch fabric shown in FIG. 1A. An I/O (such as a client machine) connected to the switch fabric can request or be requested to provide information, data, or instruction. The I/O controller can be referred to as a destination. The I/O controller in the switch fabric can also be a hosting processor node. The transfer of the packet is processed by a switch in the switch fabric.

In one example, the packet is routed to a destination through a switch which is a transparent endnode that simply passes information packets along based on the destination address in the packet (e.g., indicated by a DLID, typically located in the packet's local route header) following the datapath discussed. The packet also contains a source address (e.g., SLID) that indicates where the request came from and in some cases, where the response is to be sent back to. As mentioned, a switch is merely an exemplary interconnect device thus, other interconnect device can replace the switch in this example. The switch processes the DLID on the packet to get the packet to be routed to the destination through appropriate communication ports. As such, every destination within the Sub-Network is configured with one or more unique local identifier (LID). The LID is stored in routing table (forwarding table) included within the switch that is used to route the packet. The switch treats the LID as specification of how the packet can be routed to the destination. For instance, the LID will contain information of what path (e.g., communication ports) the switch can use to route the packet. Each packet is then forwarded to an appropriate communication port, referred to as an outbound port or an output port based on the packet's destination address (e.g., DLID) and the routing table in the switch.

In a general embodiment, FIG. 2A also illustrates that data in the form of a packet (e.g., a first data set) is shifted from the server 201 into the switch fabric 204 by first, going through the link 202(a) and then, by entering the port 5. Within the port 5, some decoding process is applied to the data (not shown) after which, the port 5 will extract the proper destination and routing path for the data. The port 5 will then issue a first routing request to the arbiter 36 to request a port access to get the data to the appropriate port in the switch I. In this example, FIG. 2A illustrates that the destination for the data is the destination 210 which interconnects with the switch II.

The request would ask for access through the port 9 since this is the port that is linked to the switch II. Once the arbiter grants the request to port 5 for the transferring of the data to port 9, this grant is broadcast (e.g., every port in the switch will see the grant) through the crossbar 22. Seeing the grant, the port 5 will begin transferring the data and the port 9 will begin receiving the data. When the data is successfully transferred to the port 9, the data will be en route to a port 1 in the switch II through a link 202(b). In one embodiment, between two communication ports of any two switches, there is only a cable connecting them together. Thus, there is only one way for data to be transferred. In such event, no further decoding is necessary.

Within the switch II, similar to above, the port 1 will decode the data, issue a second routing request to the arbiter 36, and transfer the data to the appropriate port (e.g., a port 4) which will transfer the data to the destination 210. In this example, the server 201 needs to route the data packet to the destination 210 by first routing the packet to the switch I because the switch II is not connected to the server 201. It should be noted that the first routing request to get the data out of the switch I has no association to the routing path that ultimately delivers the data to the destination 210. The first routing request instead asks for access to the port 9 so as to get the data to the switch II. Further, the second routing request is the request that corresponds to the routing path that ultimately delivers the data to the destination 210.

Figure 2B:
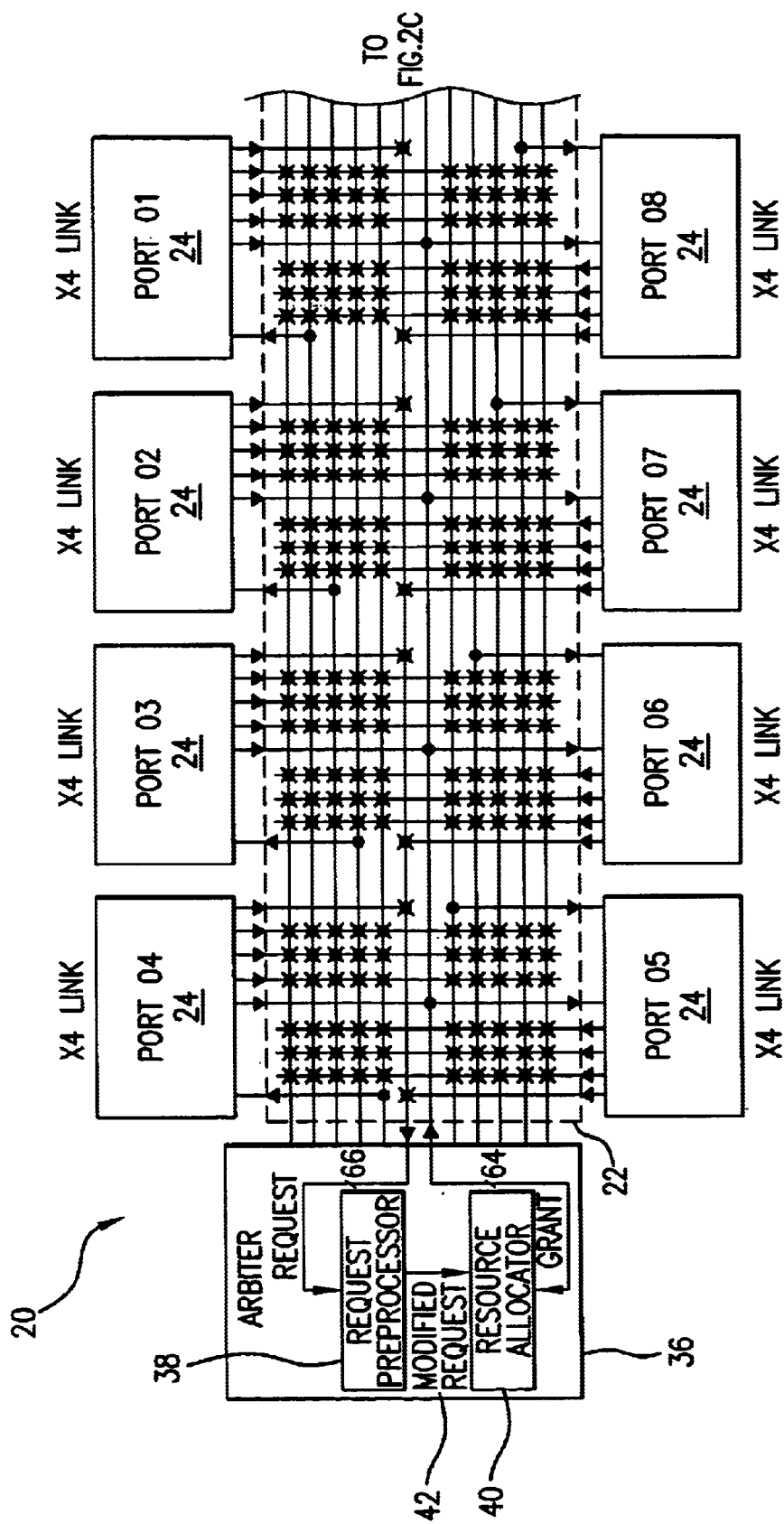
FIGS. 2B and 2C provide an exemplary diagrammatic representation of a data path, according to an exemplary embodiment of the present invention, implemented within an interconnect device (e.g., a switch)
Figure 2C:
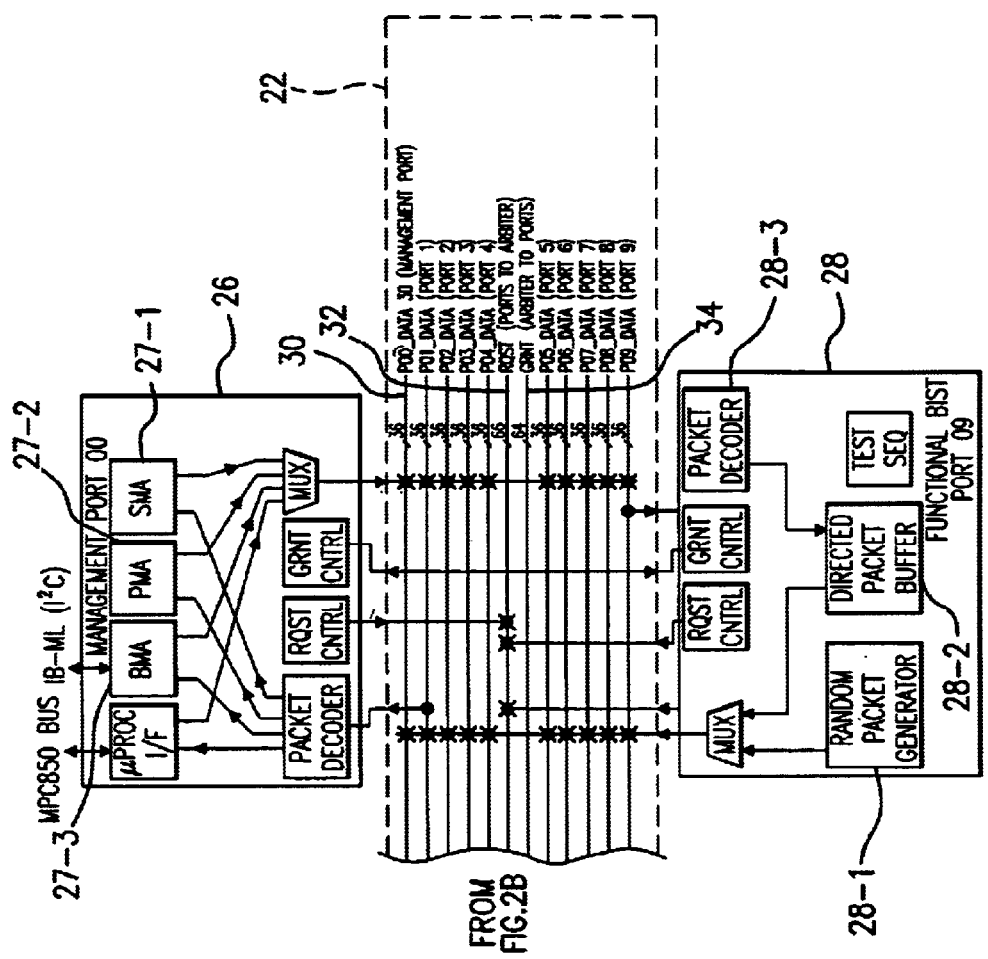

In another embodiment, data shifted within the communication network such as a switch fabric in FIG. 2A follows a request-grant scheme in a well-organized manner. FIGS. 2B and 2C provide a diagrammatic representation of a datapath 20 implemented within an interconnect device (e.g., a switch), according to an exemplary embodiment of the present invention The datapath 20 is one example of how the data are shifted in and out of any particular interconnect device such as a switch. The discussion of the datapath 20 is essential to a good understanding of the alternative routing method of the present invention.

The datapath 20 is shown to include a crossbar 22 that includes ten 36-bit data buses 30, a 66-bit request bus 32 and a 64-bit grant bus 34. Coupled to the crossbar are eight communication ports 24 (ports 1–8) that issue resource requests to an arbiter 36 via the request bus 32, and that receive resource grants from the arbiter 36 via the grant bus 34.

Resource requests are essentially requests made to the arbiter 36 to request routing channel from a particular communication port 24 associated with the routing instruction for a particular destination (e.g., processor node). The resource requests are distinct from the requests for a piece of data. In one example, the resource requests are requests issued internally within each switch to access a particular port to allow transferring of some data. In another example, the resource requests are requests are simply requests to communicate with some particular ports of some particular switches or switches of some other connected Sub-Network. Other specific examples of these resource requests include the first routing request and the second routing request issued to the arbiter 36 discussed above.

A request for a piece of data is a request made at some endnode in the communication network, (e.g., by a source) to have the data deliver to some destination. The originator or a requester of the request for data can be a processor node or other I/O controller that issues a request for information from a source containing that information, (e.g., a RAID subsystem). Alternatively, such a request can be for data that a server requests be delivered to some destination. Moreover, such a request can also be instructions issued by a manager or Sub-Network manager of the fabric to the many interconnect devices for configuration purposes or for performing some tasks.

In one embodiment, the data needs to be routed through the switch according to a routing instruction included within the request. The routing instruction typically includes a local identifier (LID) for the originator machine. For example, a destination as the destination 2 in FIG. 1A above has four LIDs which means that shifting of the data to the destination 2 can be done through four different paths. The request would identify a particular path that the data can be shifted through, (i.e., certain communication ports 24 that the data needs to be transferred through to get to the destination 2).

The routing instruction, however, can also contain a sequence of port Ids, together with a pointer: Every time the packet traverses through a switch, the port identification pointed by the pointer will be used as the output port to route the packet to. The pointer will then be stepped to point to the next port identification in the sequence. In such a way, DLID needs not to be used as the routing instruction, neither does the routing table need to specify it. Either types of packets, the one with LID and the one with sequence of port identification in its packet, still need to go through the same resource arbitration at the arbiter.

The arbiter 36 of a switch includes a request preprocessor 38 to receive resource requests from the request bus 32 and to generate a modified resource request 42 to a resource allocator 40. The resource allocator 40 then issues a resource grant on the grant bus 34. When such a grant is issued, the information packet can then be routed through the requested communication ports 24 and transferred to the requester.

In one embodiment, in addition to the eight communication ports, a management port 26 and a functional Built-In-Self-Test (BIST) port 28 are also coupled to the crossbar 22. The management port 26 includes a Sub-Network Management Agent (SMA) 27-1 that is responsible for network configuration (e.g., accessing information about the Sub-Network to discover other nodes and services, resolving routing paths, and registering the Sub-Network's service). The management port 26 also includes a Performance Management Agent (PMA) 27-2 that maintains error and performance counters, a Baseboard Management Agent (BMA) 27-3 that monitor environmental controls and status, and a microprocessor interface. Many more Management Agents can also be included in the management port 26 as needed by the switch or the switch fabric.

In one example, the functional BIST port 28 supports stand-alone, at-speed testing of an interconnect device embodying the datapath 20. The functional BIST port 28 includes a random packet generator 28-1, a directed packet buffer 28-2 and a packet decoder 28-3.

Figure 3:
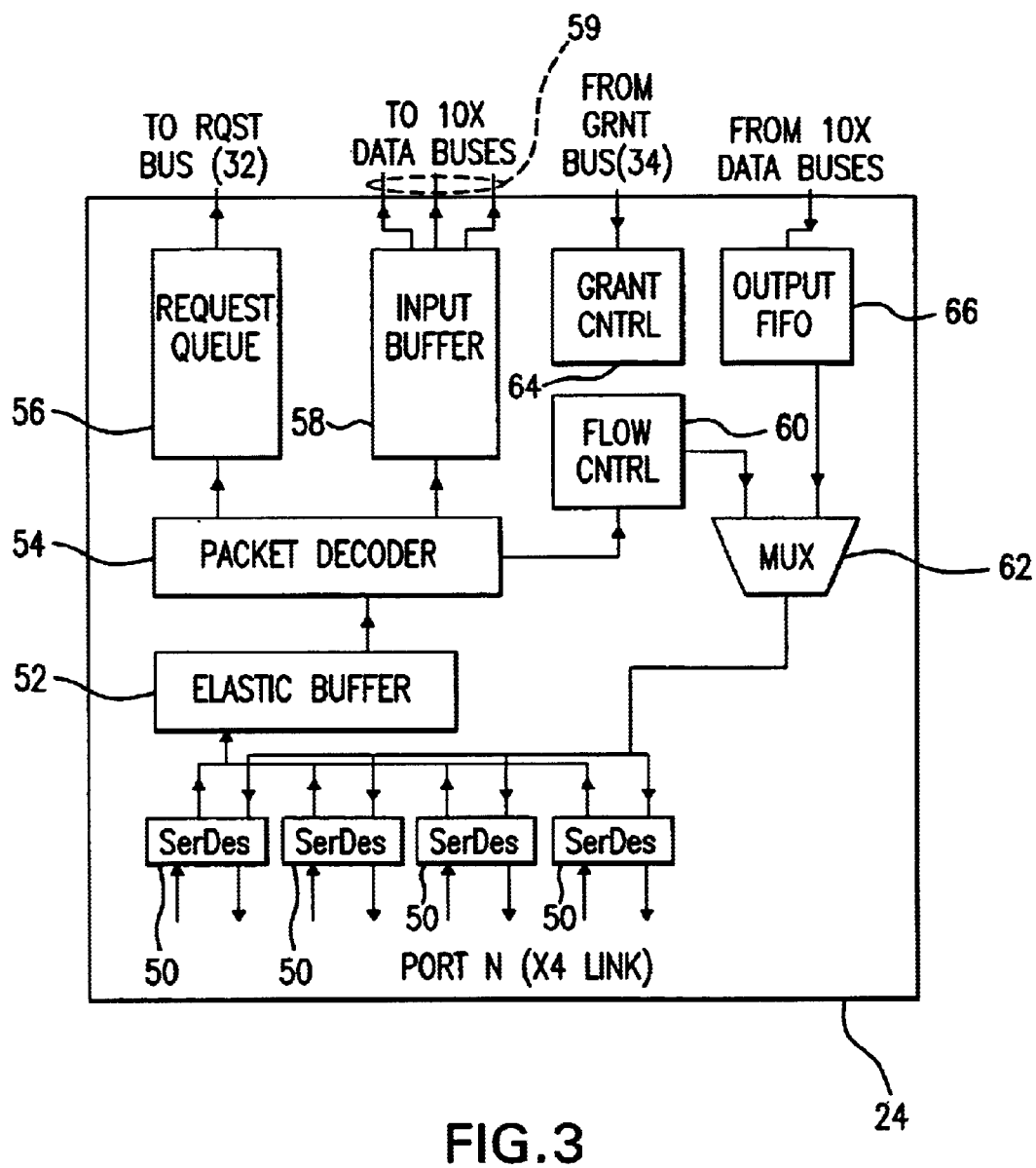
FIG. 3 is a diagrammatic representation of communications port, according to an exemplary embodiment of the present invention that may be employed within a data path 20.

Turning now to the communication ports 24, FIG. 3 illustrates an exemplary block diagram providing further architectural details of an exemplary communications port 24 as may be implemented within the datapath 20. While the datapath 20 of FIGS. 2B and 2C are shown to include eight x 4 duplex communication ports 24, the present invention is not limited to such a configuration For instance, a communication port 24 may be an x1, x4, or x12 communication port. Referring specifically to FIG. 3, each communications port 24 is shown to include four Serializer-Deserializer circuits (SerDes's) 50 via which 32-bit words are received at and transmitted from a port 24. Each SerDes 50 operates to convert a serial, coded (8B10B) data bit stream into parallel byte streams, which include data and control symbols. Data received via the registers 50 at the port 24 is communicated as a 32-bit word to an elastic buffer 52. The elastic buffer 52 has two primary functions, namely:

(1) to accommodate frequency differences (within a specified tolerance) between clocks recovered from an incoming bit stream and a clock local to the data path 20; and (2) to accommodate skew between symbols being received at the data path 20 on four serial data channels.

Incoming data is further synchronized with a core clock as it is propagated through the elastic buffer 52.

Figure 4:
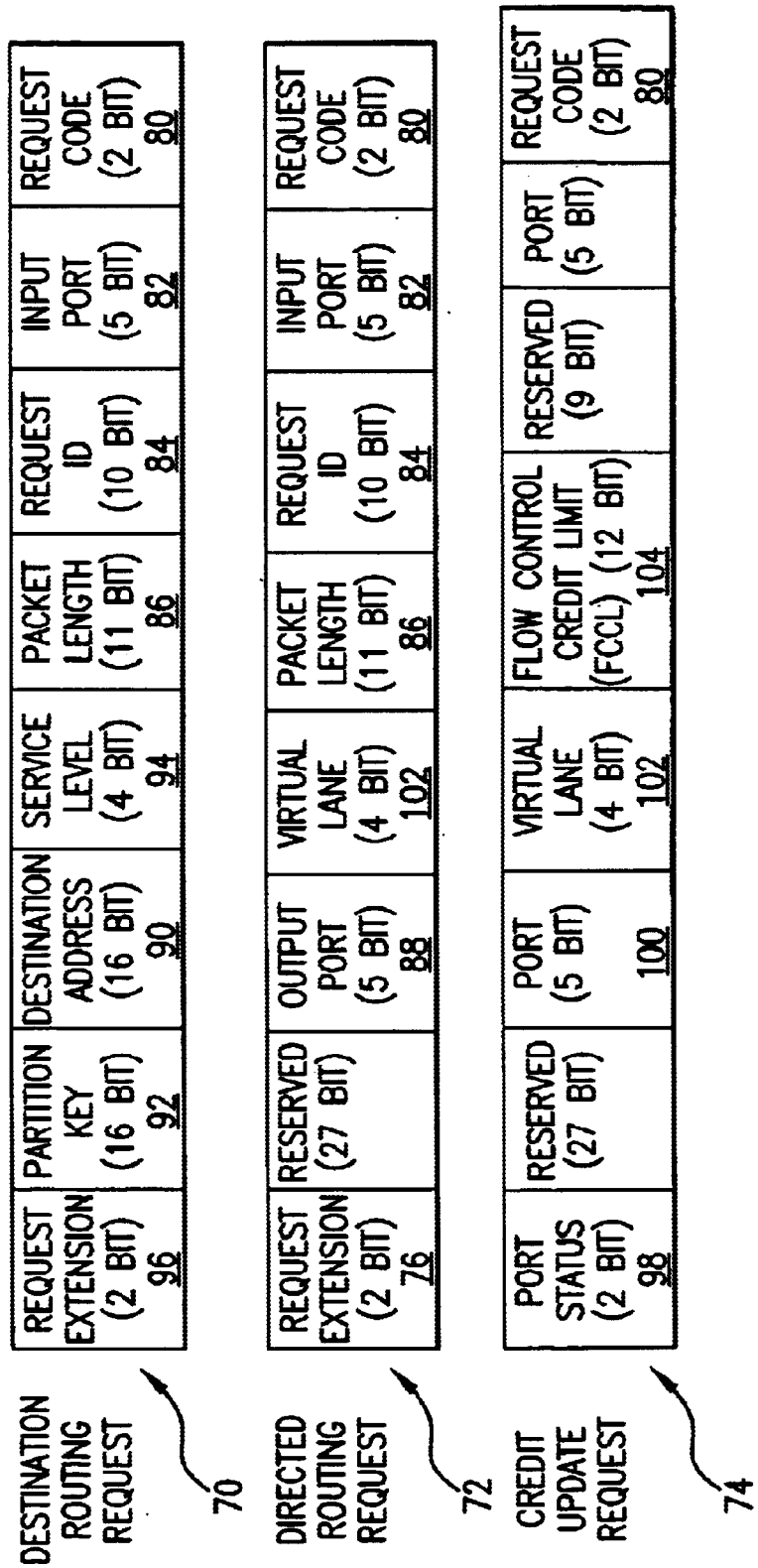
FIG. 4 illustrates exemplary packet transfer requests and an exemplary credit update request.

From the elastic buffer 52, the incoming data, packets, are communicated to a packet decoder 54 that generates a request, associated with the packet, which is placed in a request queue 56 for communication to the arbiter 36 via the request bus 32. In the exemplary embodiment of the present invention, the types of requests generated by the packet decoder 54 for inclusion within the request queue 56 include packet transfer requests and credit update requests. FIG. 4 illustrates two examples of packet transfer requests, namely a destination routing request 70 and a direct routing request 72. An exemplary credit update request 74 is also shown.

Return to FIG. 3, each communications port 24 is also shown to include a 20 Kbyte input buffer 58, the capacity of which is divided equally among data virtual lanes (VLs) supported by the datapath 20. Virtual lanes are, in one embodiment, independent data streams that are supported by a common physical link. Further details regarding the concept of "virtual lanes" is provided in the InfiniBand™ Architecture Specification, Volume 1, Oct. 24, 2000.

The input buffer 58 of each port 24 is organized into 64-byte blocks, and the packet may occupy any arbitrary set of buffer blocks. A link list keeps track of packets and free blocks within the input buffer 58.

Each input buffer 58 is also shown to have three read port-crossbar inputs 59.

A flow controller 60 also receives input from the packet decoder 54 to generate flow control information (e.g., credits) that may be outputted from the port 24 via a multiplexer (MUX) 62 and the Ser Des 50 to other ports 24. Further details regarding an exemplary credit-based flow control are provided in the InfiniBand™ Architecture Specification, Volume 1.

The communications port 24 also includes a grant controller 64 to receive resource grants from the arbiter 36 via the grant bus 34.

An output FIFO 66 has sufficient capacity to hold a maximum-sized packet, according to a communications protocol supported by the datapath 20. The output FIFO 66 provides elasticity for the insertion of inter-frame symbols, and flow control messages, between packets. The output FIFO 66 furthermore provides speed matching for moving packets from x4 to x1 ports.

Returning to FIG. 4, within the routing requests 70 and 72, a request code 80 is a 2-bit value identifying the request type, an input port identifier 82 identifies a communication port 24 from which the request was issued, a request identifier 84 is a "handle" or identifier for a request that allows the grant controller 64 of a port to associate a grant with a specific packet. For example, the request identifier 84 may be a pointer to a location within the input buffer 58 of a communications port 24. The request identifier 84 is necessary as a particular port may have a number of outstanding requests that may be granted by the arbiter 36 in any order.

A packet length identifier 86 provides information to the arbiter 36 regarding the length of a packet associated with a request. An output port identifier 88 of the direct routing request 72 identifies a communications port 24 to which the relevant packets should be directed. In lieu of an output port identifier 88, the destination routing request 70 includes a destination address or a DLID 90 and a partition key 92. A destination routing request 70 may also include a service level identifier 94, and a request extension identifier 96 that identifies special checking or handling that should be applied to the relevant destination routing request 70. For example, the request extension identifier 96 identifies that an associated packet is a subset management packet (VL15). It should be noted that a VL15 request is a request to transfer a raw type of packet that does not follow the normal packet transfer rules well practiced in the field or a standard packet where the partition key is valid/invalid. Other requests to transfer other packets typically follow the normal packet rules.

The virtual lane identifier 102 indicates for which virtual channel credit information is updated. The flow control credit limit 104 is a sum of a total number of blocks of data received (modulo 4096) at a remote receiver on the relevant virtual lane, plus the number of 64-byte blocks (credit units) left in the input buffer (or 2048 number exceeds 2048) on the given virtual lane.

To compute the number of available credits, the resource allocator 40 subtracts the total number of blocks sent on the relevant virtual lane (modulo 4096). This computation counts for packets that have been sent after the remote receiver sent a flow control message, thus making the credit forwarding mechanism tolerant of link delays. The effective computation is:

Available Credits=Last Reported Credits−(Additional blocks sent since then)−(Remote value of total blocks received).

Arbiter

Figure 5:
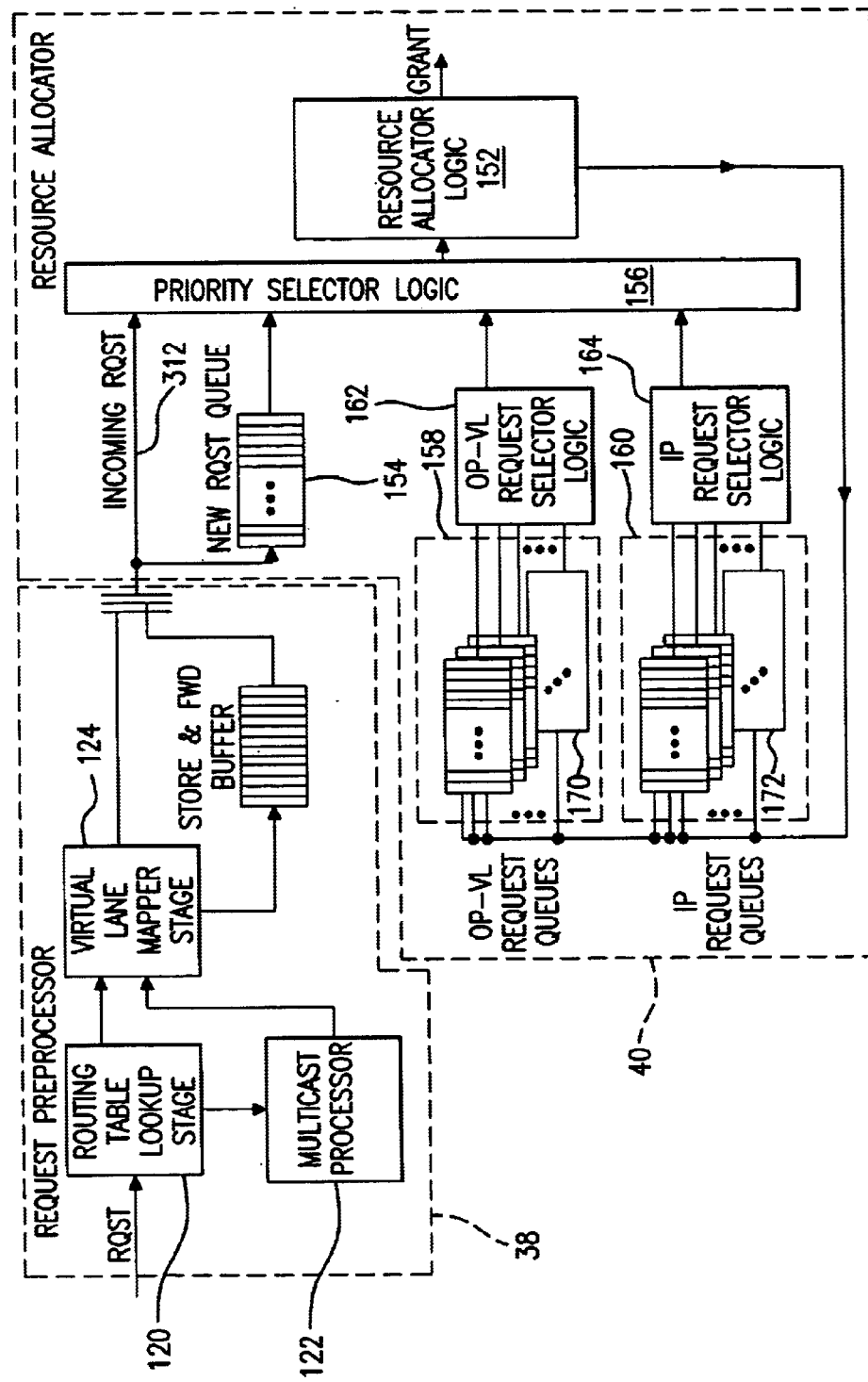
FIG. 5 is a block diagram illustrating the conceptual architecture of an arbiter, according to an exemplary embodiment of the present invention.

FIG. 5 is a conceptual block diagram of the arbiter 36, according to an exemplary embodiment of the present invention. The arbiter 36 manages flows of routing requests for multiple transferring of packets. The arbiter 36 is shown to include the request preprocessor 38 and the resource allocator 40. As discussed above, the arbiter 36 implements a central arbitration scheme within the datapath 20, in that all requests and resource information are brought to a single location (i.e., the arbiter 36). This offers certain advantages in that a central, consolidated view of resource availability and demand allow efficient resource allocation and potentially increased throughput. It should however be noted that the present invention may also be deployed within a distributed arbitration scheme, wherein decision making is performed at local resource points to deliver potentially lower latencies.

The arbiter 36, in the exemplary embodiment, implements serial arbitration in that one new request is accepted per cycle, and one grant is issued per cycle. The exemplary embodiment implements serialization as it is envisaged that an interconnect device including the datapath 20 will have an average packet arrival with a rate of less than one packet per clock cycle.

Dealing first with the request preprocessor 38, a request (e.g., a destination, routing, direct routing or credit update request 70, 72 or 74) is received on the request bus 32 at a routing table lookup stage 120 that includes both unicast and multicast routing tables (not shown). A routing table (also referred to as a forwarding table) includes routing paths for at least one LID. When a packet arrives at the arbiter 36, the LID for the destination of the packet (DLID) is compared to the routing table to determine the routing path for the particular DLID.

A unicast routing table comprises routing information for a single interconnect device (e.g., a single channel adapter or router port). A unicast routing table is designed to work for a unicast identifier. For instance, when a packet with an identifier DLID for a single interconnect device arrives at the arbitier 36, the DLID is compared against a unicast routing table, and the packet is delivered to the port identified by that identifier. A unicast routing request may be issued to an arbiter in the switch to request access to a communication port that will allow the transfer of the packet to the destination having that DLID using the identified port.

A multicast routing table comprises routing information for a set of interconnect devices (e.g., a set of channel adapters or router ports). A multicast routing table is designed to work for a multicast identifier. For instance, when a packet with an identifier LID for a set of interconnect devices arrives at the arbiter 36, the LID is compared against a multicast routing table, and the packet is delivered to all of the ports identified by that identifier. A multicast routing request may be issued to an arbiter in the switch to request a plurality of accesses to a plurality of communication ports that will allow the transfer of the packet to the multiple destinations identified in that DLID using the identified ports.

More specifically, a packet's destination address 90 (shown in FIG. 4) is utilized to perform a lookup on both the unicast and multicast routing tables. In one exemplary embodiment, if the destination address is for a unicast address, the destination address 90 is translated to an output port number. On the other hand, if the destination is for a multicast group, a multicast processor 122 spawns multiple unicast requests based on a lookup in the multicast routing table.

From the routing table lookup stage 120, a request is forwarded to a virtual lane mapper stage 124 where a request's service level identifier 94 (shown in FIG. 4), input port identifier 82 and output port number (determined at stage 120) are utilized to perform a lookup in a virtual lane map (not shown) and to output a virtual lane identifier.

Figure 6:
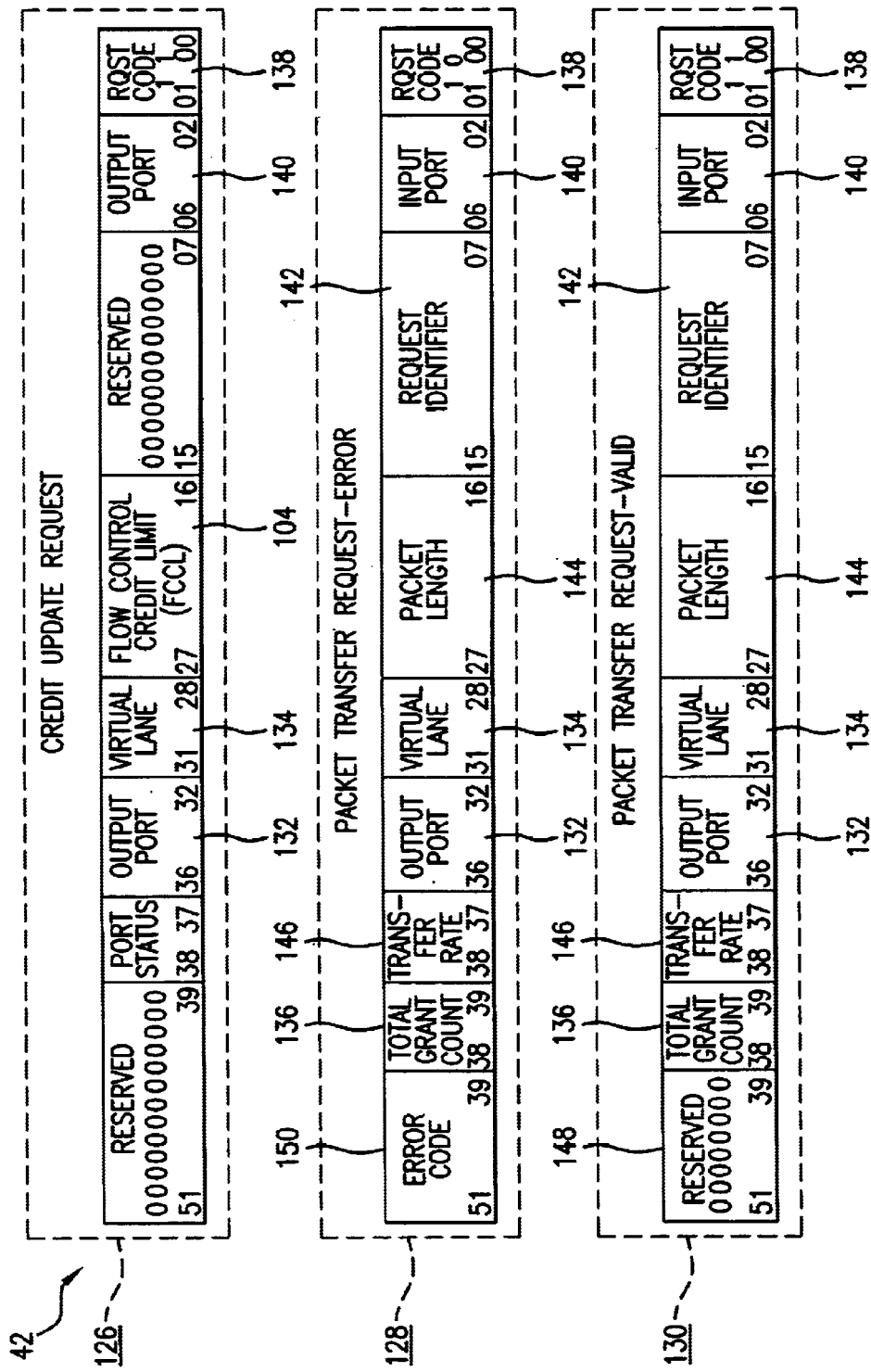
FIG. 6 provides representations of exemplary modified resource requests that may be outputted from a request preprocessor to a request allocator of the arbiter illustrated in FIG. 5.

Accordingly, the output of the request preprocessor 38 is a modified request that is derived from an original request, such as any of those shown in FIG. 4. FIG. 6 is a diagrammatic representation of exemplary modified resource requests 42 that may be outputted from the request preprocessor 38 to the resource allocator 40 (shown in FIG. 2B). Taking a valid packet transfer request 130 as an example, FIG. 6 illustrates that the request 130 includes an output port identifier 132 generated at the routing table lookup stage 120 and a virtual lane identifier 134 generated at the virtual lane mapper stage 124.

A total grant count value 136 may also included within the request 130. The total grant count value 136 is generated at the routing table lookup stage 120, and is utilized to track multicast requests.

Other fields within the valid package transfer request 130 may include a request code 138, an input port identifier 140, a request identifier 142, a packet length value 144, a transfer rate value 146, and a reserved field 148. The request code 138 identifies request type. The input port identifier 140 identifies the port 24 from which the request originated. The request identifier 142 uniquely identifies the request. The packet length value 144 identifies the number of 4-byte words within a packet. The transfer rate value 146 identifies the speed at which the packet will be sent through the crossbar 22 of the datapath 20.

The error package transfer request 128 is similar to the request 130, but includes an error code 150 that identifies a unique error usually detected within the request preprocessor, but sometimes detected in the resource allocator 40.

The credit update request 126 is shown to include substantially the same information as the credit update request 74 illustrated in FIG. 4.

FIG. 5 also illustrates an exemplary modified request (e.g., any of the requests 126, 128 or 130) 312 that is received at the resource allocator 40 from the request preprocessor 38. An incoming (or just-arrived) modified request 312 may proceed directly to resource allocator logic 152, if there is no contention with further pending requests stored in a new request queue 154 that are awaiting processing by the resource allocator logic 152. If such contention does exist, an incoming modified request 312 is placed at the back of the new request queue 154.

As stated above, FIG. 5 is a conceptual diagram of the arbiter 36, and the various queues and selectors described above may not be physically implemented as discrete components or logic blocks. For example, the request queues discussed below and above are, in one embodiment, each implemented as link lists within a single pending request buffer. Nonetheless, for a conceptual understanding of the present invention, it is useful to make reference to FIG. 5.

In one embodiment, the resource allocator 40 is shown to include priority selector logic 156 that implements a priority scheme to feed resource requests from one of four sources to the resource allocator logic 152. The four sources from which the priority selector logic 156 selects a resource request are; (1) an incoming request 312; (2) the new request queue 154; (3) a group 158 of output port-virtual lane (OP-VL) request queues 170; and (4) a group 160 of input port (IP) request queues 172. The group 158 of output port-virtual lane (OP-VL) request queues 158 has output port-virtual lane (OP-VL) request selector logic 162 associated therewith for performing a selection of requests from within the group 158 of queues for presentation to the priority selector logic 156. Similarly, the group 160 of input port (IP) request queues has input port request selector logic 164 associated therewith to select a request for presentation to the priority selector logic 156. It will be noted that two levels of selection logic are employed for these groups of queues. A first level of selection logic is employed to select requests from a group 158 or 160 of queues associated with a first resource type (e.g., output port-virtual lane combinations), each queue being associated with a specific instance of the resource type. A second level of selection logic is employed to select between requests that emerge from each group of queues based on a priority scheme.

At a high level, the arbiter 36 employs a two-level allocation policy. The first level of the allocation policy combines flow control credits and port availability in an "all-or-nothing" allocation policy. Considering a request received at the resource allocator logic 152 from the priority selector logic 156, if (1) sufficient flow control credits for a virtual lane identified by the virtual lane identifier of the request are available and (2) if an output port identified by the output port identifier 132 of the request is available, then both the virtual lane and output port identified within the relevant request are allocated to the request by the resource allocator logic 152.

On the other hand, if either insufficient flow control credits for a virtual lane, or the output port itself, are currently unavailable, then no resources (i.e., neither the virtual lane nor the output port) are allocated, and then a request is placed at the back of an output port-virtual lane (OP-VL) request queue 170 corresponding to the requested output port and virtual lane.

The second level of the allocation policy is for input buffer read port availability. As this is the second level of the allocation policy, a request must first acquire flow control credits for a virtual lane and a destination output port before an input read buffer port is committed by the resource allocator logic 152. Accordingly, once a virtual lane and destination output port have been allocated, if an input read buffer port is not available, the relevant request is put on the back of an input port (IP) request queue 172 corresponding to an input port identified within the relevant request by the input port identifier 140.

The output port-virtual lane request selector logic 162 monitors each of the request queues 170 within the group 158 of output port-virtual lane request queues. As flow control credits and output ports become available, the selector logic 162 chooses among pending requests in the group 158 of queues. In an exemplary embodiment of the present invention where the arbiter 36 supports the InfiniBand™ Architecture, the output port-virtual lane request selector logic 162 may implement the InfiniBand VL arbitration scheme.

Similarly, the input port request selector logic 164 monitors each of the input port request queues 172 within the group 160 as input buffer read ports 59 become available. The selector logic 164 chooses among pending requests utilizing, for example, a simple round-robin selection policy.

Figure 7:
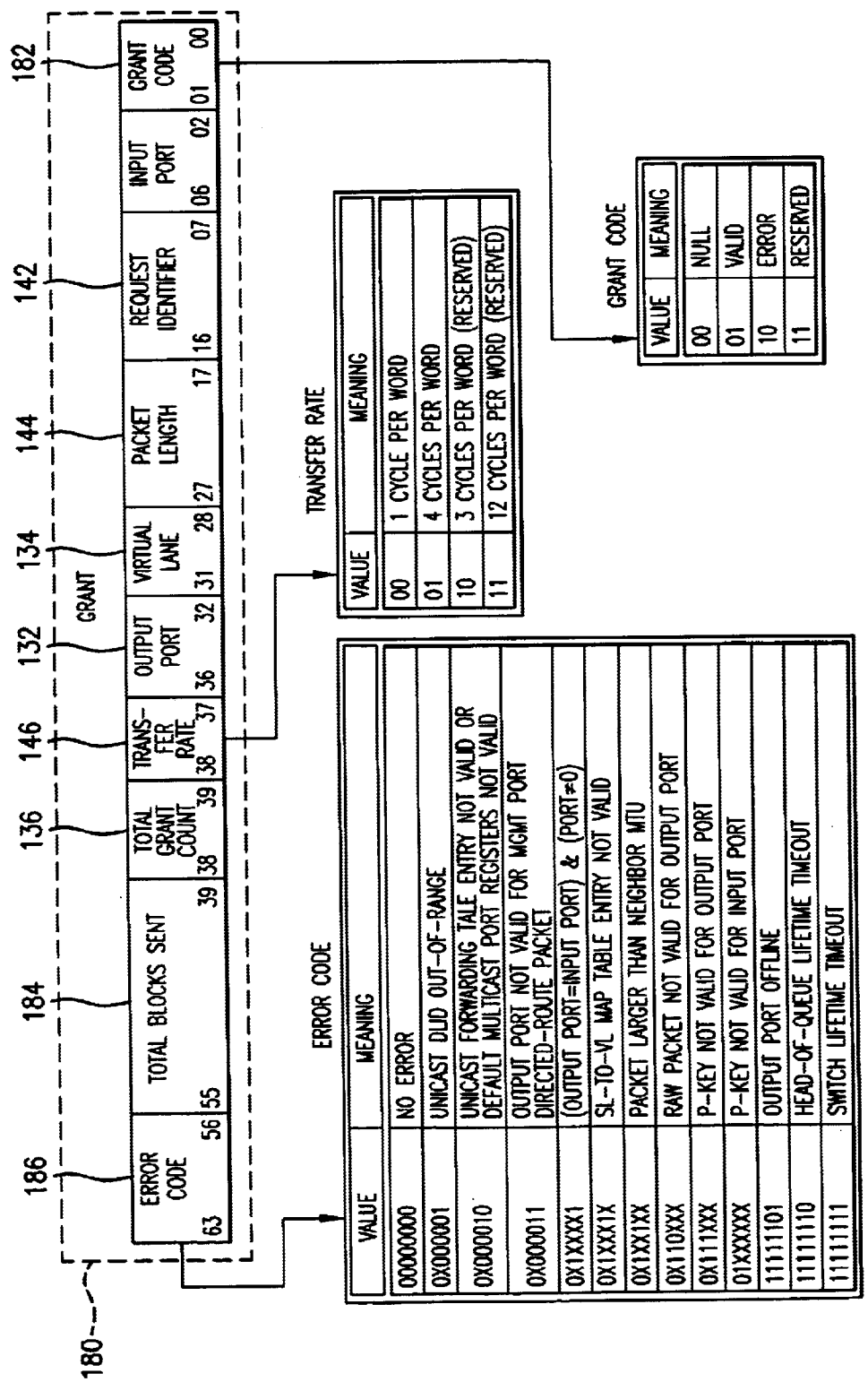
FIG. 7 illustrates an exemplary grant that may be issued responsive to any one of the requests discussed in the present application.

Upon the availability of all resources required to satisfy a particular request, the resource allocator logic 152 will issue a grant 180, on the grant bus 34. FIG. 7 illustrates the content of an exemplary grant 180. The grant 180 contains a number of fields in common with a request, as well as an additional grant code 182, a total blocks sent field 184, and an error code field 186.

The discussions above (FIG. 5, 6 and 7) illustrate how the arbiter 36 manages the flows of multiple routing requests for access to communication ports 24. The arbiter 36 thus manages when data can be transferred from one communication port 24 to another to get to the final destination.

Alternative Routing

Figure 8:
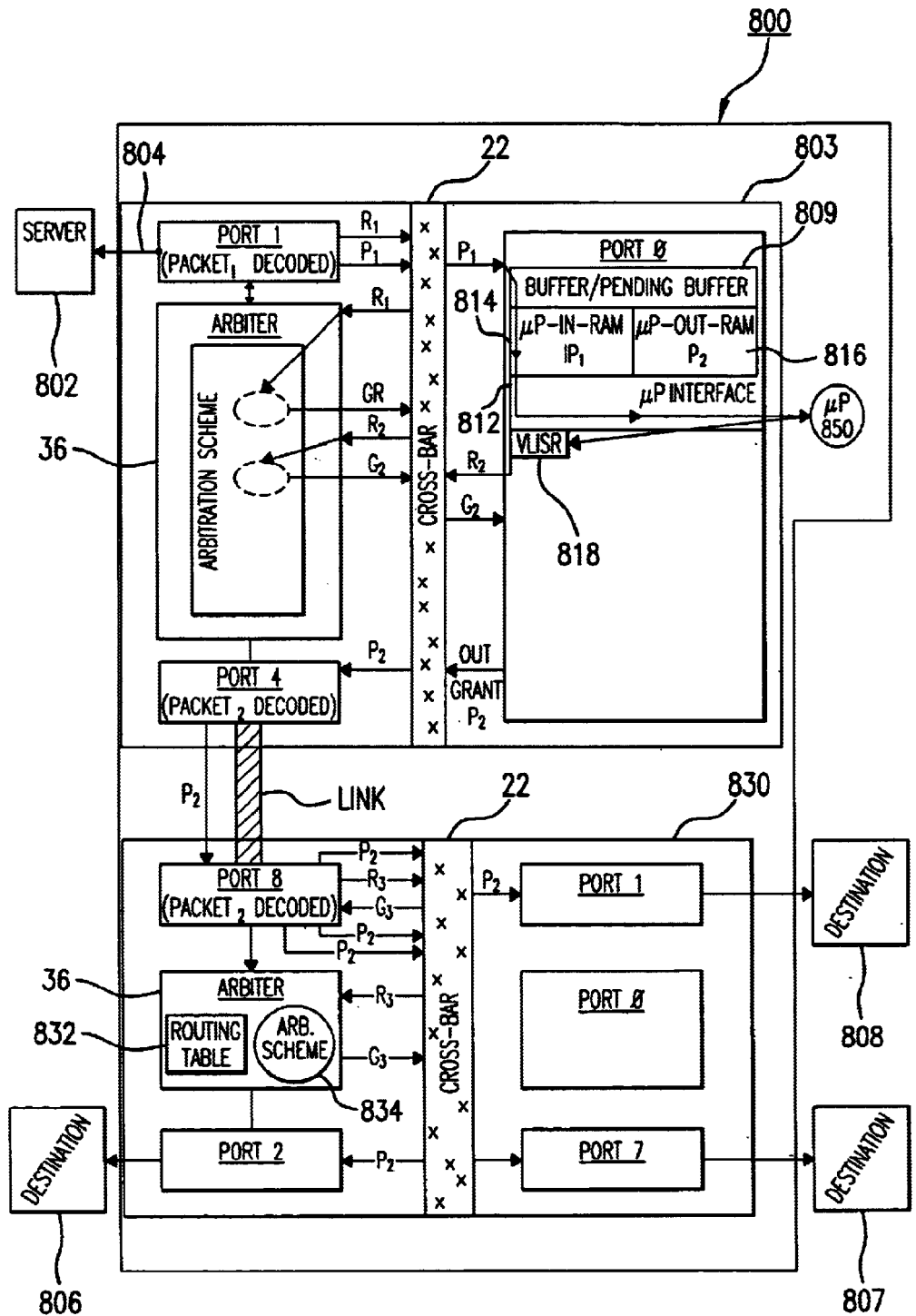
FIG. 8 illustrates an exemplary embodiment of the present invention wherein a Sub-Network Manager residing on a microprocessor interconnected to the management port of a switch is used to transfer data.

FIG. 8 illustrates another exemplary embodiment 800 of the presentation. In the exemplary embodiment 800, the Sub-Network (e.g., a switch fabric 800) includes processor 850, such as a microprocessor 850, a Motorola microprocessor, such as Motorola microprocessor MPC860, an Intel i960®, or any of the Intel Pentium processors, or MIPS® processors. Any time a processor is chosen, a matching processor interface will need to be used or. The microprocessor 850 that is connected to a switch has software entities performing one or several of the General Service Managers, the Sub-Network Manager, or the Data Transport Manager. The General Service Managers and the Sub-Network Manager are described in the InfiniBand™ Architecture Specification Volume 1, Release 1.0 mentioned above. The Data Transport Manager is a software intelligent that is responsible for moving data from a point A to a point B (e.g., from one interconnect device to another). These managers of the switch fabric manage the communication network and the flow of data within this communication network. In one example, these managers are the same managers discussed above in relation to FIG. 2C. The microprocessor 850 however, also has another software entity to extract a packet that was addressed to it, follow the transferring instructions (or handling instructions) that came with the packet, and then, inject the packet into the switch fabric through some special microprocessor interface.

These transferring instructions tell the microprocessor 850 where to transfer the packet to (e.g., to another switch in the switch fabric) in order to get the packet to the appropriate destination (e.g., destinations 806–808). In one instance, these transferring instructions instruct the microprocessor 850 to generate a first routing request in order to transfer the packet to a second interconnect device. This second interconnect device is capable of transferring the packet to the ultimate destination.

In one example, the microprocessor 850 executes a Routing Modifier Manager (RMM) to perform the function of generating the appropriate resource request to the arbiter 36. The RMM is a piece of software running on a standard microprocessor architecture. The resource request is similar to the first routing request discussed above with regard to FIG. 2A.

Under this design, the microprocessor 850 has the ability to generates a resource request to be issued for the arbiter 36 to route the packet to some particular ports. Under this design, the resource request that requests to route the packet out of a switch has no association to the DLID of the packet. The DLID, as discussed, contains addresses of the destination that the packet ultimately needs to be delivered to. Typically, this DLID is identical to the LID of the destination because the packet would have the LID of the destination in the DLID.

Normally, to route a packet out of a switch, the resource request made to the arbiter has an association with the DLID. There is such an association because the resource requests access to a communication port that is dedicated (or assigned) to this DLID. For instance, in FIG. 8, a packet 2 has arrived at a port 8 of a switch 830. The port a resource request R3 to an arbiter 36 of the switch 830 requesting a port access to transfer the packet 2 to a port 1 which is connected to a destination 808. The packet 2 would have a routing instruction in the DLID that instructs the port 8 to transfer the packet 2 to the destination 808. Under one routing mechanism, called directed routing, the routing instruction tells the port 8 port 1 to route the packet to the destination 808. Under another routing mechanism, this arbiter 36 has a routing table 832 that identifies the necessary communication port, (e.g., a port 1) associated with the DLID to get data to the destination 808. In any event, the resource request R3 has an association to the routing instruction in the DLID of the packet 2 since the request is for a port access to the port 1 which is associated and consistent with the routing instruction.

The exemplary embodiment of the current invention discussed below, however, does not require a resource request to have an association to the DLID in the actual packet under transferring, packet 1. The switch that the packet 1 is first injected into does not need to have a routing table that includes the LID matching with the DLID for the packet 1. Alternatively, the switch may not have a connection to the destination for the packet at all. The packet 1 in the present embodiment can first be addressed to the microprocessor 850 that resides in the port 0 using the LID for the port 0 and a set of handling (or transferring) instructions in the packet 1.

The RMM on the microprocessor 850 will then generate a resource request from the contents of the packet 1. This resource request is issued to an arbiter 36 with appropriate LID, which came with the handling instructions in the packet 1, to get the packet 1 delivered to the appropriate switch (or the appropriate interconnect device) that can deliver the packet 1 to the final destinations. The DLID of the packet 1 that is generated by the RMM may not be the same as the DLID in the resource request sent to the arbiter 36. In essence, the DLID in the packet 1 need not be present in the routing table of the switch into which the packet 1 is first injected. Instead, the DLID can be present in another subsequent switch, for example, the switch that the microprocessor 850 will generate request to have the packet 1 delivered to. Thus, the DLID only need to be present in the switch that ultimately routes the packet 1 to the final destinations. The switch that ultimately routes the packet to its final destination can be referred to as the appropriate interconnect device or a second interconnect device.

In one example, the microprocessor 850 lives under the port 0 of a switch. The microprocessor 850 is shown to interconnect to a switch 803 of the switch fabric 800. The microprocessor 850, a chip, can be coupled to the switch 803, which is typically also a chip, via some conventional electrical coupling. It will be appreciated that the microprocessor 850 needs not reside within the switch fabric 800. The microprocessor 850 can reside in a device outside the fabric 800 so long as an electrical interconnection can be established between the microprocessor and the port 0 of the switch 803.

The switch 803 also comprises several communication ports as discussed above, though FIG. 8 only shows three exemplary ports, port 1, port 4 and port 0. Ports 1 and 4 are the communication ports 24 discussed above. Port 0 comprises a standard port interface (not shown) and a microprocessor interface 812 which further includes microprocessor-input-RAM 814 and a microprocessor-output-RAM 816. Together with the standard port interface, the microprocessor interface 812 delivers a packet to the microprocessor for processing.

Figure 1B:
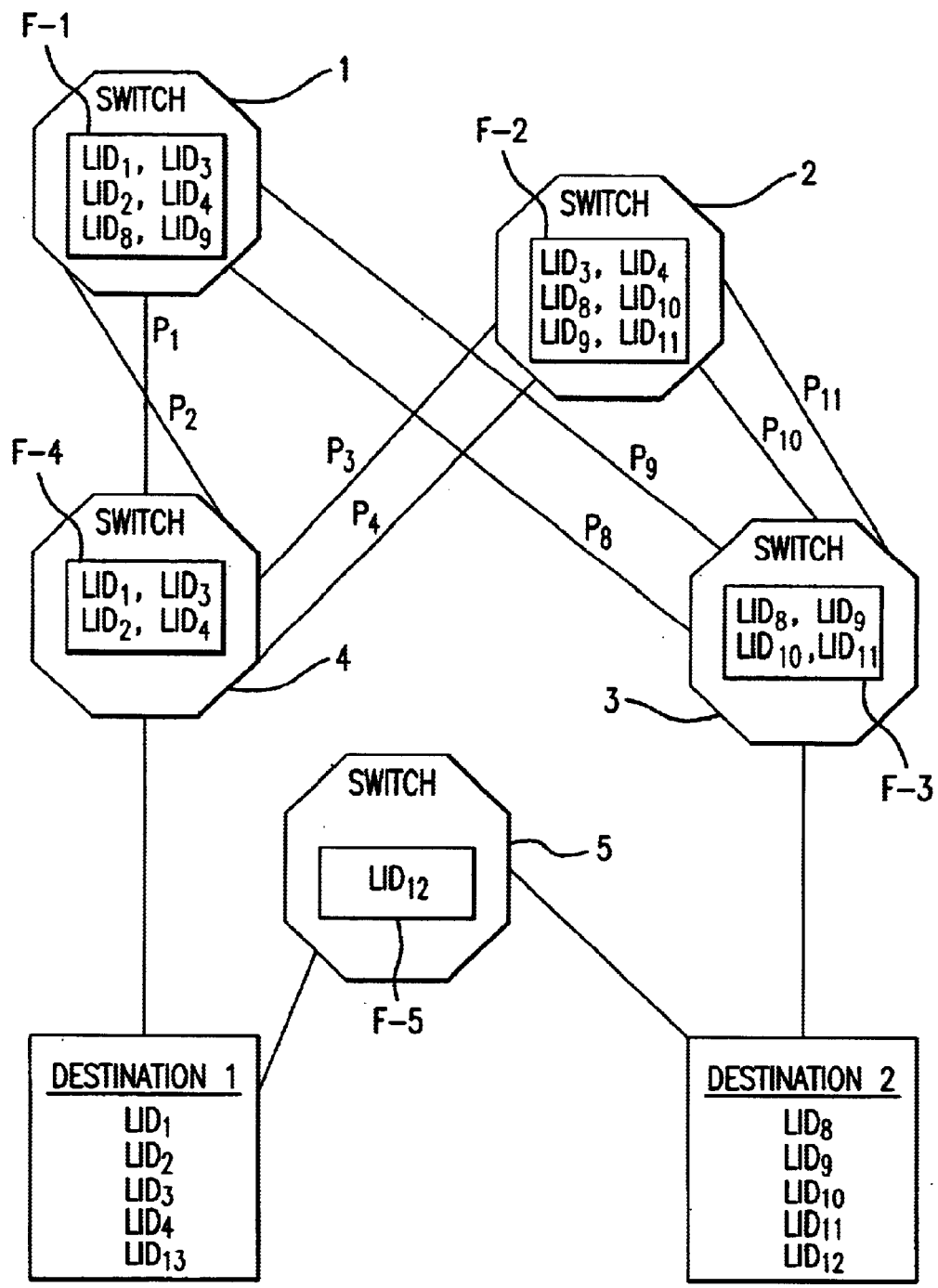
FIG. 1B illustrates an exemplary diagrammatic representation of a multi-path data routing system of the prior art.
Figure 1C:
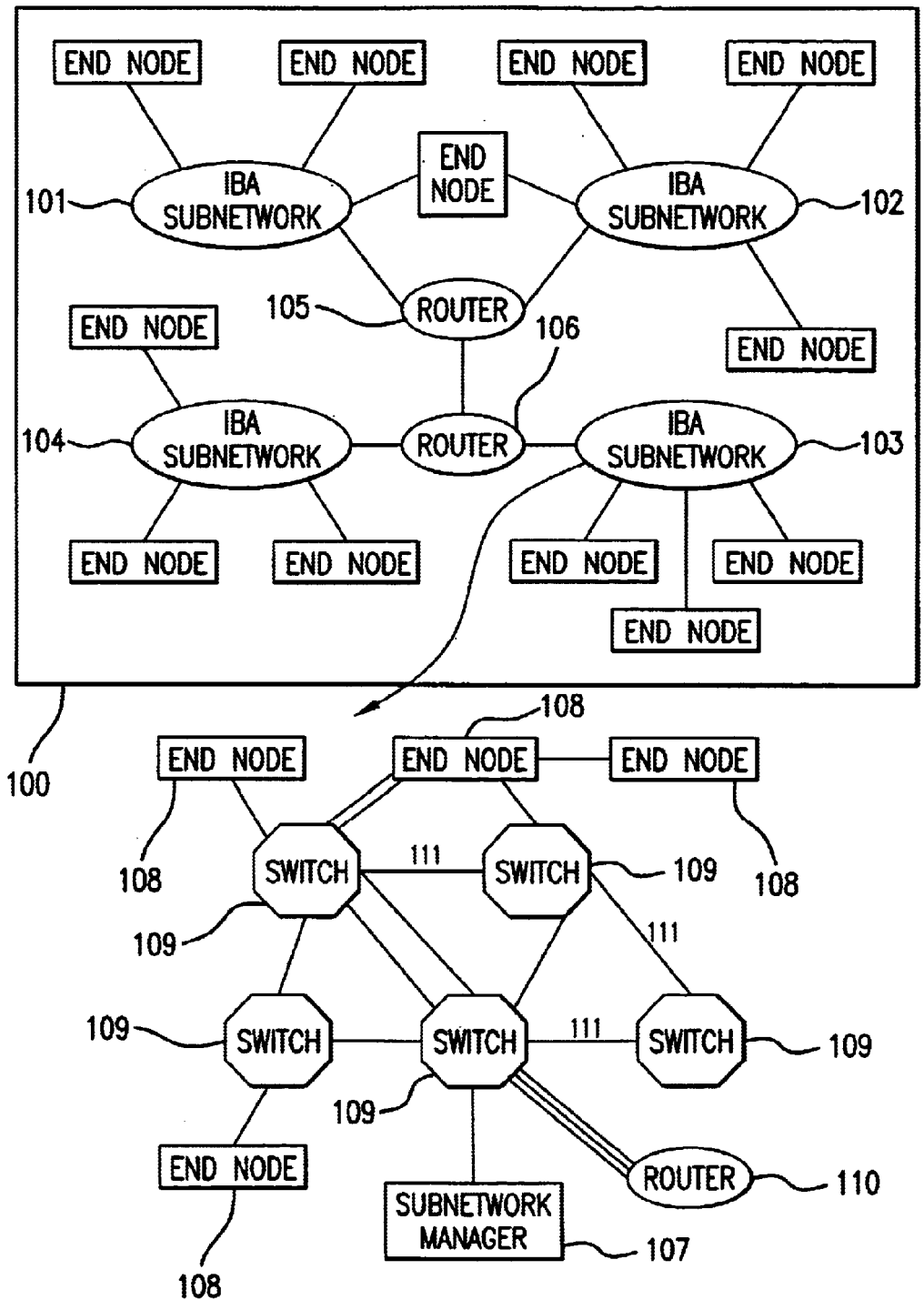
FIG. 1C illustrates an exemplary diagrammatic representation of a communication network having multiple Sub-Networks and interconnect devices.

In one example, the packet 1 that is addressed to the microprocessor has the LID that is specific for the port 0. The interfaces in the port 0 is designed such that the packet 1 will be delivered directly to the microprocessor 850. Then the microprocessor 850 will generate a request, for example, a VL15 request 818 (a VL15 request is a resource request made by the Sub-Network manager to the arbiter 36, and more discussion on the VL15 can be found in the Infini-Band™ Architecture Specification Volume 1, Release 1.0, released Oct. 24, 2000 by the InfiniBand™ Trade-Association). The Sub-Network manager here can be the Sub-Network manager 107 described in FIG. 1B. In one embodiment, the Sub-Network manager 107 resides within the microprocessor 850 (not shown). Other types of resource request, such as VL0, (one that is made by one of the General Service Managers), can also be generated by the microprocessor without deviating from the scope of the invention.

The VL15 request 818 (R2) will contain the information that requests the arbiter 36 to enable the port 0 to allow the microprocessor 850 residing in the port 0 to transfer the packet 1 to a communication port 24 in the switch, for example, a port 4 of FIG. 8. A port such as the port 4 should be one that is linked (interconnected) to another port in a switch that can handle the routing of the packet 1 to appropriate destinations. For example, the port 4 is connected to a port 8 in a switch 830, hence, the port 0 will issue a resource request to the arbiter 36 for the transferring of the packet 1 to the port 4. Once at the port 4, the packet 1 will go through the normal routing mechanism and be delivered to the right destinations.

In another embodiment, a server 802 in the communication network 800 has determined that it needs to send a packet of data (packet 1) to three destinations 806, 807, and 808 to multicast the packet). It may be that the server 804 wishes to route the packet first to the switch 803. However, in one example, the switch 803 does not have the routing table that can handle the delivery of the packet 1 to the three destinations 806–808. In another example, the destinations 806–808 may have other paths (not shown) to which the server 802 can route the packet 1. These paths may be congested, disabled, or simply busy. In yet another example, the server 802 may wish to save the data bandwidth for other purposes as opposed to holding the packet 1 and consuming the bandwidth while the packet 1 is being successfully transferred to all three destinations. One reason could be that because one or two of the destinations may take a while to free up their respective buffer's to receive new data, thus requiring the server 802 to hold the packet 1. In a further example, the server 802 may wish to optimize the utility of the microprocessor 850 residing on the management port, the port 0. The port 0 may not have the capability to handle the multicasting of the packet 1 in this example (since the packet 1 is to be delivered to three destinations). It will be appreciated that the reasons above are not the exhaustive reasons of why the server 802 decides to transfer the packet 1 first to the switch 803.

FIG. 8 illustrates that in one exemplary scenario, the server 802 interconnects with the port 1 of the switch 803 through a link 804. The link 804 can be a cable connector or a cable modem mentioned above. The packet 1 is shown to have arrived at the port 1, which will decode the packet 1 using the packet decoder 54 discussed above. Upon decoding, the port 1 will determine that the packet 1 needs to be sent to the port 0 for processing. Similar to the mechanism mentioned above, the port 1 will issue a resource request R1 to the arbiter 36 via the crossbar 22 to request the transferring of the packet 1 to the port 0. The request R1 will then he received by the arbiter 36, which will subject the request R1 through an arbitration scheme (see the Arbiter discussion above). When the arbiter 36 determines that the request R1 can now be granted, the arbiter 36 will issue a grant Gr1. This grant Gr1 is broadcast to all of the ports in the switch 803 at the same time via the crossbar 22. When the port 1 determines that the grant Gr1 has been granted, the port 1 will begin transferring the packet 1 to the port 0. And, when the port 0 sees that the grant Gr1 has been granted for something to be delivered to itself, the port 0 will begin receiving the packet 1.

In one embodiment, the packet 1 will contain routing instructions such as where to route the packet 1. These instructions may contain the DLIDs for the destinations 806–808 to which the packet 1 needs to be routed. Alternatively, the microprocessor 850 may need to extract the DLUDs from the packet 1. The microprocessor 850 may also need to extract the data that needs to be sent to these destinations. In essence, the microprocessor 850 can generate a packet 2 which is the packet that is ultimately routed to those destinations.

In one embodiment, when arriving at the port 0, the packet 1 will first be delivered into the buffer 809, which also includes a pending buffer. In the event that the port 0 is busy with previous request, the packet 1 will be dropped into the pending buffer 814 until the buffer is clear to receive the packet 1. The packet 1 will then be transferred to the microprocessor interface 812 and be placed in the $\mu$P-in-RAM 814 (an input Random Access Memory for the microprocessor 850). The interface 812 is designed such that the microprocessor 850 will be notified that the packet 1 has arrived and that the microprocessor 850 will be able to extract the data packet and the routing information or routing instruction from the packet 1. In one example, the packet 1 includes the instructions for the microprocessor 850 to generate a request for the transferring of the packet 1 to a port 4 of the switch 803. In such an event, the microprocessor 850 will place the packet 1 in the $\mu$P-out-RAM 816 (an output Random Access Memory for the microprocessor 850) to prepare for delivery.

In the case that the network manager residing on the microprocessor 850 is a Sub-Network manager, the microprocessor 850 will generate a resource request VL15 request 818 (R2) to transfer the packet to the port 4. (A VL15 request means that the request comes from the Sub-Network manager). The request R2 will be issued to the arbiter 36, which will then subject the request R2 to the arbitration scheme. As above, when the arbiter 36 determines that the request R2 can now be granted, the arbiter 36 will issue a grant Gr2. This grant Gr2 is, again, broadcast to all of the ports in the switch 803 at the same time via the crossbar 22. When the port 0 determines that the grant Gr2 has been granted, the port 0 will begin transferring the packet 1 to the port 4 (sometimes referred to as an "out grant"). And, when the port 4 sees that the grant Gr2 has been granted for something to be delivered to itself, the port 4 will begin receiving the packet 1.

One feature of the unique microprocessor interface 812 of the present invention is that the microprocessor 850 has an ability to process a resource request, such as the VL15 request 818. This resource request asks for port access to a port has not association to the DLIDs in the packet 1. This resource request also has no association to the routing instructions. For example, these instructions tell the microprocessor 850 that the packet 1 needs to be delivered to destination 806–808. The transferring instructions, also in the packet 1, however, tell the microprocessor 850 that it needs to route the packet 1 (or the content of the packet 1, packet 2) to the switch 830. It is the switch 830 that will perform the actual transfer of the packet 1 to these destinations. Thus, the microprocessor will generate a resource request R2 to get the packet 1 to the switch 830 and as such, the request R2 has no association to the routing instructions that came with the packet 1.

In essence, the DLIDs in the packet 1 may have no association to the resource request that asks for access to the port 4. As will be shown below, the DLIDs in the packet 1 is actually associated only with ports 1, 2, and 7 of the switch 830. Thus, the packet 1 has no relationship with this resource request which requests access to the port 4 of the switch 803.

Another feature of the unique microprocessor interface 812 is that after the grant Gr2 has been broadcasted and the packet 1 has been delivered to the port 4, the microprocessor 850 will clear the requests VL15 making room for a new resource requests if necessary.

In another embodiment, the microprocessor 850 may need to strip off the routing instruction that came with the packet 1 in effect creating a packet 2 which contains only the information or the contents intended for the destinations 80–6808 that needed to be transferred. The packet 2 is thus substantially identical to the packet 1 except that the routing instructions originally came with the packet 1 have been removed. The packet 2 may, however, contain other routing instructions that instruct the switch 830 where to route the packet 2. The packet 2 will be stored in the μP-out-RAM 816 waiting to be delivered to the port 4. When the grant G2 is broadcast, the port 0 will deliver the packet 2 to the port 4 (sometimes referred to as an out grant). The port 4 will then decode the packet 2 and determine that the packet 2 needs to be routed to a port 8 in a switch 830. The routing of the packet 2 will be through the link 820.

In one embodiment, the port 4 will then decode the packet 1 (or packet 2) and determine that this packet needs to be routed to a port 8 in a switch 830. The routing of this packet will be through the link 820.

FIG. 8 further illustrates that the packet 2 is shown to have arrived at the port 8, which will decode the packet 2 using the packet decoder 54 discussed above. Upon decoding, the port 8 will determine that the packet 2 needs to be delivered to destinations 806–808. Similar to the mechanism mentioned above, the port 8 will issue a resource request R3 to the arbiter 36 via the crossbar 22 to request the transferring of the packet 2 to the destinations 806–808. Upon being received at the arbiter 36, a routing table 832 would help the arbiter 36 to determine that the packet 2 would need to be routed through ports 1, 2, and 7. One reason for that is the packet 2 will have DLIDs that are assigned to each of the destinations 806–808. The routing table 832 will record that the ports 1, 2, and 7 are associated with these particular DLIDs. It should be noted that the routing table 832 of this example may be a multicast routing table since the packet 2 needs to be delivered to more than one destination. Further, the request R3 may be a multicast routing request since it requests to send the packet 2 to multiple destinations.

The request R3 will also be subjected through an arbitration scheme 834. When the arbiter 36 determines that the request R3 can now be granted using the mechanism mentioned above, the arbiter 36 will issue a grant Gr3. This grant Gr3 is simultaneously broadcast to all of the ports in the switch 830 via the crossbar 22. When the ports 8 determines that the grant Gr3 has been granted, the port 8 will begin transferring the packet 2 to the ports 1, 2, and 7. And, when each of these ports see that the grant Gr3 has been granted for something to be delivered to each of them, each of these ports will begin receiving the packet 2. These ports can receive the packet 2 simultaneously or at different time. In one example, the port 8 will spawn three packets 2 so that each can be transferred to one of the three destinations through the ports 1, 2, and 7.

The embodiment in FIG. 8 can also be used to perform multicasting of a packet using a manager (Sub-Network, General Service, or Data Transport Managers) in the event that these managers are not designed to perform multicasting. In one example, each of the switches in the switch fabric has different configurations and requirements. A Sub-Network Manager, for example, is one manager that is typically used to configure the switches in the switch fabric and because each switch has different configuration needs, it is unnecessary for the Sub-Network Manager to have a multicasting feature. The Sub-Network Manager thus, typically sends different instructions and information to different switches. In this case, multicasting is unnecessary. Hence, using the embodiment in FIG. 8, a data management feature can be added to the microprocessor 850 that enabled data to be shifted around the switch fabric even in the multicasting event.

In another embodiment, the switch 803 is the same as the switch 830. Either of the two switches can generate the resource request discussed above that has no association to the routing instructions.

The embodiment, in FIG. 8 can also be used to address the problem of congested communication port.

Figure 9:
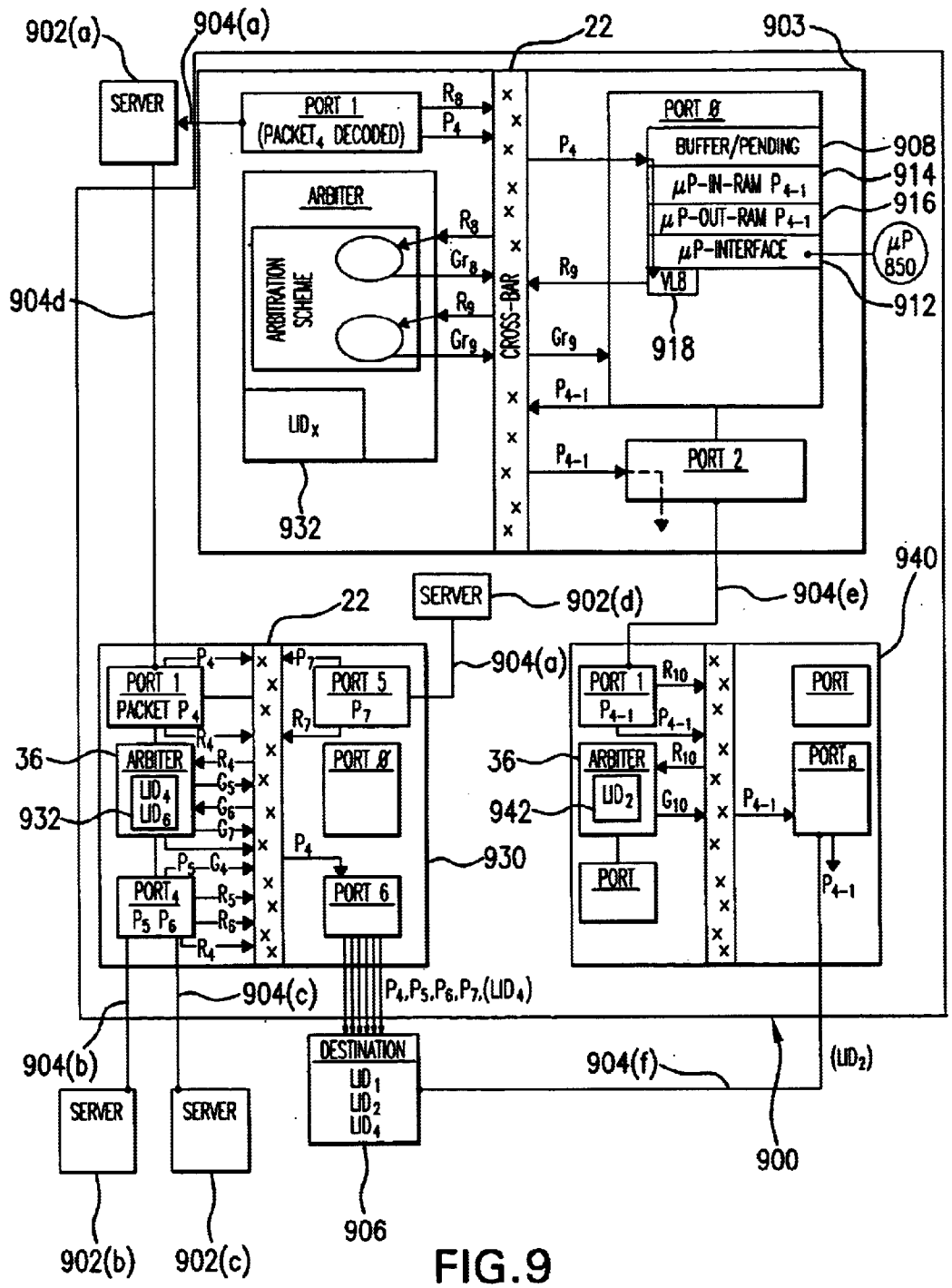
FIG. 9 illustrates an exemplary embodiment of the present invention wherein a Data Manager residing on a microprocessor interconnected to the management port of a switch is used to transfer data through an alternative routing path.

FIG. 9 further discloses such an example. In one embodiment, there are four servers (servers 902a, 902b, 902c, and 902d) that want to transfer data (packets) to a destination 906. All of these servers may transfer the data using the switch 930 of the switch fabric 900.

In one instance, a packet 4 is shown to have arrived at the port 1 of the switch 930, which will decode the packet 4 using the packet decoder 54 discussed above. Upon decoding, the port 1 will determine that the packet 4 needs to be delivered to a destination 906. Similar to the mechanism mentioned above, the port 1 will issue a resource request R4 to the arbiter 36 via the crossbar 22 to request the transferring of the packet 4 to the destination 906 through a port 6 of this switch. Upon being received at the arbiter 36, a routing table 932 can also help the arbiter 36 to determine that the packet 4 would need to be routed through the port 6 according to the routing path information provided with the LID 4. The routing table 932 of this example nay be a unicast routing table since the packet 4 needs to be delivered to only one destination.

Similar to the embodiments above, the request R4 will also be subjected through an arbitration scheme (not shown here). When the arbiter 36 determines that the request R4 can now be granted using the mechanism mentioned above, the arbiter 36 will issue a grant Gr4. This grant Gr4 is broadcast to all of the ports in the switch 930 at the same time via the crossbar 22. When the ports 1 determines that the grant Gr4 has been granted, the port 1 will begin transferring the packet 4 to the port 6. And, the port 6 sees that the grant Gr4 has been granted for data to be delivered itself, the port 6 will begin receiving the packet 4.

The same process described immediately above can be happening at the same time for the packet 5, 6, and 7. The packet 5 is sent to the destination 906 from the server 902(b), the packet 6 is sent to the destination 906 from the server 902(c), and the packet 7 is sent to the destination 906 from the server 902(d). All of these requests to transfer the may be issued simultaneously. Alternatively, the port 6 of the switch 930 could be doing the same packet transferring to some other destinations not shown in this figure. The communication of data through this particular port can be extremely busy and overly burdensome on the particular port while some other port may be free and under-optimized.

The server that needs to send data to the destination 906 can utilize some other switches that may have communication ports that are not congested.

In one embodiment, the server 902(a) interconnects with the port 1 of the switch 903 through a link 904a. The link 904a can be, for example, a cable connector or a cable modem mentioned above. The packet 4 is shown to have arrived at the port 1, which will decode the packet 4 using the packet decoder 54 discussed above. Upon decoding, the port 4 will determine that the packet 4 needs to be sent to the port 0 for processing. The packet 4 may contain instructions that tell the port 1, that the arbiter 36 of the switch 903 does not have the LID2 in its routing table 932 for the destination 906 and as such, the packet 4 needs to be directed to the microprocessor residing in the port 0. This instruction can simply be an address (LDDx) dedicated to getting packets delivered to the microprocessor 850.

Similar to mechanism mentioned above, the port 1 will issue a resource request R8 arbiter 36 via the crossbar 22 to request the transferring of the packet 4 to the port 0 of the switch 903. The request R8 will then be received by the arbiter 36 which will subject the request R8 to an arbitration scheme. When the arbiter 36 determines that the request R8 can now be granted using the mechanism mentioned above, the arbiter 36 will issue a grant Gr8. This grant Gr8 is broadcast to all of the ports in the switch 903 at the same time via the crossbar 22. When the port 1 determines that the grant Gr8 has been granted, the port 1 will begin transferring the packet 4 to the port 0. And, when the port 0 sees that the grant Gr8 has been granted for data to be delivered to the port 0, the port 0 will begin receiving the packet 4.

In one embodiment, the packet 4 will contain the routing instructions, such as, where to route the packet 4. These instructions may contain the DLID for the destination 906 to which the packet 4 needs to be routed. Alternatively, the microprocessor 850 may need to extract the DLID from the packet 4. The microprocessor 850 may also need to extract the data that needs to be sent to the destination 906. In essence, the microprocessor 850 can generate a packet 4-1 which is the packet that is ultimately routed to the destination 906.

In one embodiment, when arriving at the port 0, the packet 4 will first be delivered into the buffer 908 also includes a pending buffer. In the event that the port 0 is busy with previous request, the packet 4 will be dropped into the pending buffer until the buffer is clear to receive the packet 4. The packet 4 will then be transferred to the microprocessor interface 912 and be placed in the μP-in-RAM 914. The interface 912 is designed such that the microprocessor 910 will be notified that the packet 4 has arrived and that the microprocessor 910 will be able to extract the data packet and the routing information or routing instruction from the packet 4. In one example, the packet 4 includes the instructions for the microprocessor 850 to generate a request for the transferring of the packet 4 to a port 1 of the switch 940. In such an event, the microprocessor 850 will place the packet 4 in the μP-out-RAM 916 to prepare for delivery.

In the case that the network manager residing on the microprocessor is a General Service manager, the microprocessor will generate a resource request VL8 918 (R9) transfer the packet to the port 4. In this particular example, another manager such as a Routing Modifier Manager (RMM), also residing on the microprocessor 850, is the manager that will generate the resource request. The RMM generates a resource request VL8 issues it to the arbiter 36 as a request R9 (a VL8 is a resource request generates by any particular manager of the switch fabric 900). The arbiter 36 will then subject the request VL8 918 arbitration scheme. As above, when the arbiter 36 determines that the request R9 can now be granted, the arbiter 36 will issue a grant Gr9. This grant Gr9 is, again, broadcast to all of the ports in the switch 903 at the same time via the crossbar 22. When the port 0 determines that the grant Gr9 has been granted, the port 0 will begin transferring the packet 4 to the port 2 (sometimes referred to as an "out grant"). And, when the port 2 sees that the grant Gr9 has been granted for data to be delivered to itself, the port 2 will begin receiving the packet 4.

In another embodiment, the microprocessor 850 nay need to strip off the routing instructions that came with the packet 4 in effect creating a packet 4-1 which contains only the data needed to be transferred to the destination 906. The packet 4-1 is then substantially identical to the packet 4 except that the routing instructions that came with the packet 4 have been removed. The packet 4-1 may however contain other routing instructions that instruct the switch 930 where to deliver the packet 4-1. The packet 4-1 will be stored in the μP-out-RAM 916 waiting to be delivered to the port 2. When the grant G9 is broadcast, the port 0 will deliver the packet 4-1 to the port 2. The port 2 will then decode the packet 4-1 and determine that the packet 4-1 needs to be routed to a port 1 in a switch 940. The routing of the packet 4-1 will be through the link 940(e).

In one embodiment, the port 2 will then decode the packet 4 (or the packet 4-1) and determine that this packet needs to be routed to a port 1 in a switch 940. The routing of this packet will be through a link 904(e).

FIG. 9 further illustrates that the packet 4-1 is shown to have arrived at the port 1 of the switch 940, which will decode the packet 4-1 using the packet decoder 54 discussed above. Upon decoding, the port 1 will determine that the packet 4-1 needs to be delivered to destination 906. The packet 4-1 will also contain the LID2 for the destination 906. LID2 is shown to be present in the routing table 942. Similar to the mechanism mentioned above, the port 1 will issue a resource request R10 to the arbiter 36 via the crossbar 22 to request the transferring of the packet 4-1 to the destination 906. Upon being received at the arbiter 36, a routing table 942 is utilized by the arbiter 36 to determine that the packet 4-1 needs to be routed through a port 8 according to the routing information in the LID2. One reason for that is that the packet 4-1 has a DLID that is assigned to the destination 906. The routing table 942 will have the port 8 associating with the DLID. It should be noted that the routing table 942 of this example may be a unicast routing table since the packet 4-1 needs to be delivered to only one destination.

The request R10 will also be subjected to an arbitration scheme. When the arbiter 36 determines that the request R10 can now be granted using the mechanism mentioned above, the arbiter 36 will issue a grant Gr10. This grant Gr10 is broadcast to all of the ports in the switch 940 at the same time via the crossbar 22. When the ports 1 determines that the grant Gr10 has been granted, the port 1 will begin transferring the packet 4-1 to the port 8. And, the port 8 sees that the grant Gr10 has been granted for data to be delivered to it, it will begin receiving the packet 4-1. The port 8 will then deliver the packet 4-1 to the destination 906 using the link 904(f) which is dedicated for LID2.

The embodiment in FIG. 9 also enables the transferring of a packet through a switch wherein that switch does not contain the LID that is present in the packet and the particular destination for the packet. As mentioned above, in order for a packet to get to a destination, the packet must contain the LID for that destination. In the prior art, the LID for that destination must be found in the routing table of the switch that the packet is injected into. Also in the prior art, this LID is compared to the routing table to get the routing path for the delivery of the packet to the destination. However, the exemplary embodiments of the present invention enable the generation of a routing request to access a port that has no association to the DLID in the packet. The microprocessor 850 thus is able to generate a resource request to direct the packet to another switch that has a routing table that contains the LID such that the packet can be delivered to the proper destination.

Another feature of the present invention is that the embodiments in FIGS. 8 and 9 can be used to re-route the packets (instructions) that are suppose to be sent to the management agents to the microprocessor 850. In the event that the management agents, which ray possibly resides on some interconnect device or some hardware, are disabled or otherwise down, the packets for these management agents can be re-routed to the microprocessor 850. In one example, software can be implemented in the microprocessor 850 in any conventional manner. The software can then be used to handle these packets, for instance, decode these packets and perform tasks that these management agents were suppose to perform Since the microprocessor 850 can generate request to get packets out of the ports in the switch, these packets may be directed to the proper destination even when the management agents are disabled.

Figure 10:
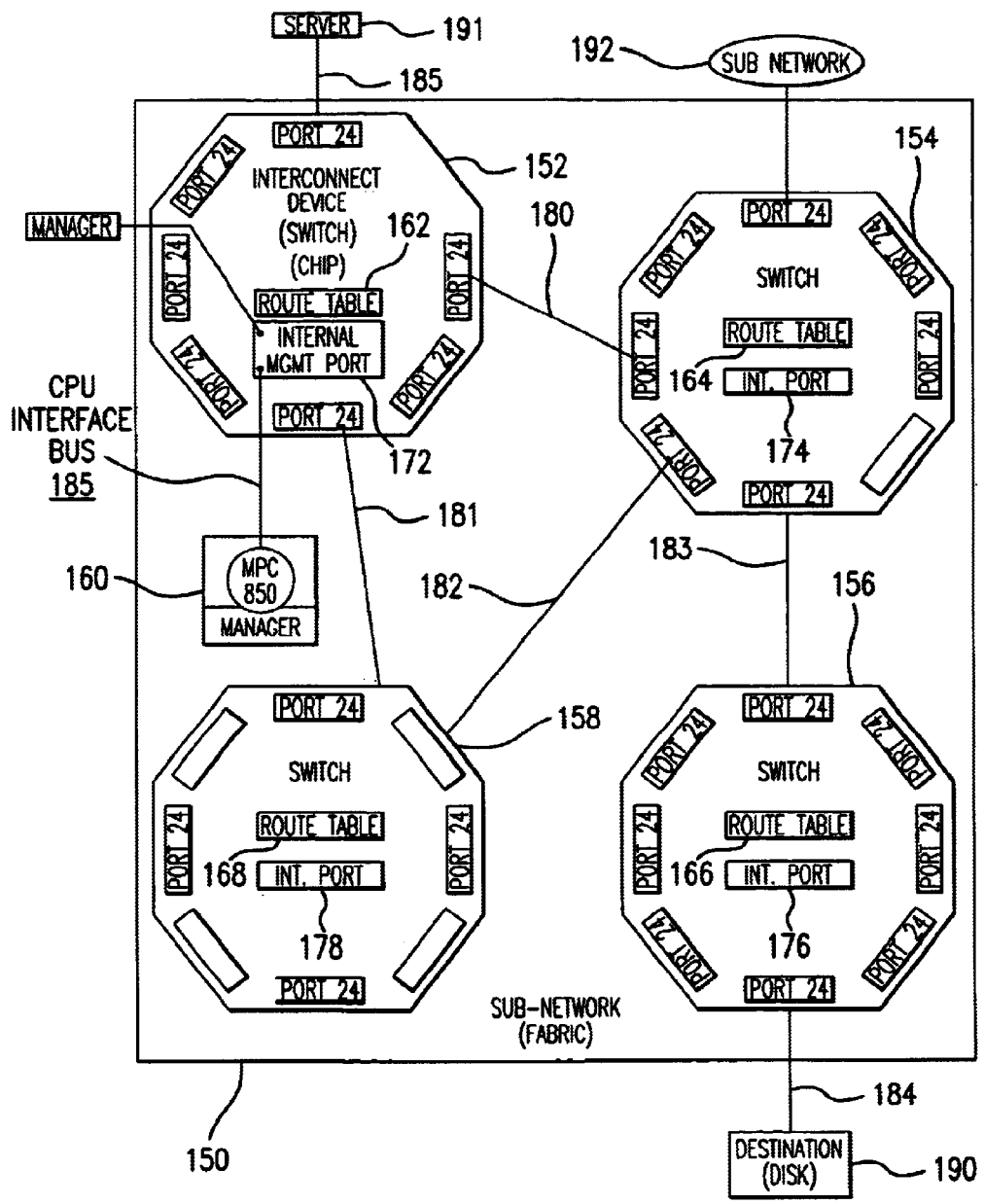
FIG. 10 illustrates an exemplary general embodiment of the present invention of how data is transferred within a switch fabric.

FIG. 10 illustrates an exemplary general embodiment of the present invention. This figure illustrates a method to transfer data through a communication network, for example, a switch fabric 150. The switch fabric 150 comprises several interconnect devices (e.g., switches 152, 154, 156, and 158) connected to each other via several links (e.g., links 180–183). As mentioned earlier, the switch fabric 150, which may be a Sub-Network of a larger communication network, may also be interconnected to other Sub-Networks (e.g., Sub-Network 192 ). Each of these switches further includes a routing table (e.g., 162, 164, 166, and 168). The routing tables will contain the routing path information for particular destinations. Each of these switches further includes communication ports referred to earlier as communication ports 24. In one example, each switch has eight (8) communication ports. Each switch also includes an internal management port, typically known as port 0, (e.g., internal management ports 172, 174, 176, and 178). Ports 0 are reserved for the switches to receive information or instruction from a manager for purpose of configuring the switches.

As shown in this figure, a server 191 may be connected to the switch fabric 150 via link 185. A station with a disk (also referred to as a destination) 190 may also be connected to the switch fabric 150 via link 184. In a basic scheme, the server 191 may want to send some data to the destination 190 using the interconnect devices of the switch fabric 150.

In this embodiment, a microprocessor (e.g., $\mu$HP 850) is coupled to an internal management port in a switch 152. The microprocessor 850 of the present embodiment executes a manager that is typically used for configuring and managing the switch fabric 150. However, in the present invention, the microprocessor 850 is also used to execute a manager that is capable of generating a routing request to send a data packet to the destination 190. The routing request of the present embodiment is unique in that the routing request requests for an access to a port in the switch that has no have any association to the routing instruction in the packet to be sent to the destination 190.

In this embodiment, the server 191 may first address the packet to be sent to the destination 190 directly to the manager 160 residing in the microprocessor 850 of the switch 152. The switch 152 may not have information concerning the routing path to get the packet to the destination 190. However, the switch 156 does have information concerning the routing path to the destination 190 (e.g., the routing table 166 will have the routing path to the destination 190. The microprocessor 850 is able to generate a routing request to get the packet out of the switch 152 and into the switch 156. The switch 156 will then route the packet directly to the destination 190.

The foregoing discussion focused more in one way to route data, specifically, a routing data mechanism that utilizes routing table present in each switch or interconnect device. Another way of routing the data is referred to as directed routing. In direct routing, the routing information or routing instruction, (e.g., which communication ports, which switch, or which Sub-Network, to route the data through) present in the packet will specifically dictate the specific route for shifting the data in the switch fabric. The embodiments discussed above will apply to the direct routing way of routing data in the same way they are applied to the routing data mechanism that utilizes routing tables. For instance, the switch that receives the data packet would follow the routing information or routing instruction specified in the packet to route the data through the appropriate communication port and switch In the event that the data packet was directed to the microprocessor 850 for any of the reasons discussed above (e.g., congested port), the microprocessor 850 would generate routing requests as described above to get the packet to be transferred through the appropriate communication port and switch to get to the final destination.

Overall, the microprocessor 850 and the unique interface of the embodiments discussed above also enable a more efficient way of managing the communication network. The microprocessor 850 enables the senders of packets who have knowledge of the configuration of the network to choose the routing paths of any packet, to utilize the paths that are not congested, and to address problems associated with congested paths. The ability of the sender to choose the routing path relies essentially on the ability of the microprocessor 850 to generate request for port accesses that are not contained within the routing instruction of the packet.

Note also that embodiments of the present description may be implemented not only within a physical circuit (e.g., on semiconductor chip) but also within machine-readable media. For example, the circuits and designs discussed above may be stored upon and/or embedded within machine-readable media associated with a design tool used for designing semiconductor devices.

Thus, it is also to be understood that embodiments of this invention may be used as or to support a software program executed upon some form of processing core (such as the CPU of a computer) or otherwise implemented or realized upon or within a machine-readable medium. A machine-readable medium includes any mechanism for storing or transmitting information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

We claim:

1. A method of facilitating data transfers through a communication network, said method including:

forwarding a first data set received from a first interconnect device to a processor, said first data set having transfer instructions and routing instructions associated therewith, said routing instructions specifying a destination for said first data set;

extracting said transfer instructions at said processor; and generating a first routing request for said first data set according to said transfer instructions to transfer said first data set to a second interconnect device capable of routing said first data set to said destination, said first routing request having no association to said routing instructions.

2. A method as in claim 1 wherein said second interconnect device is the same as said first interconnect device.

3. A method as in claim 1 wherein said transfer instructions are addressed to said processor instructing said processor to generate said first routing request.

4. A method as in claim 1 wherein said transfer instructions are addressed to a manager residing in said processor instructing said manager to generate said first routing request.

5. A method as in claim 1 wherein said routing instructions further indicate a routing path for said data transfers including a transfer of said first data set to said destination.

6. A method as in claim 1 wherein said routing instructions further indicate a communication port sequence and a pointer for said communication port sequence wherein said pointer is an output port identifying a communication port dedicated to said data transfers including a transfer of said first data set to said destination, said communication port configured to perform at least one of data sending, data receiving, and route requesting.

7. A method as in claim 1 wherein said routing instructions further indicate an address for said destination such that said address identifies said destination.

8. A method as in claim 1 wherein said first interconnect device is coupled to said second interconnect device using a plurality of links wherein each of said plurality of links is one of a 1×link, a 4×link, and a 12×link.

9. A method as in claim 1 wherein each of said interconnect devices is one of an ASIC chip, a switch, a router, a repeater, and an adapter.

10. A method as in claim 1 wherein said processor is a microprocessor.

11. A method as in claim 1 wherein said communication network is a switch fabric and wherein said interconnect devices are switches.

12. A method as in claim 1 further including:

generating a second data set at said processor and routing said second data set to said second interconnect device, said second data set being substantially identical to said first data set except that said second data set does not have said transfer instructions associated therewith, said second interconnect device further including a routing table having a routing path to route said second data set to said destination.

13. A method as in claim 12 further including:

generating a second routing request for said second data set at said second interconnect device, said second routing request having an association to said routing instructions wherein said second routing request requests a port access to a communication port present in said second interconnect device to route said second data set to said destination.

14. A method as in claim 13 wherein said communication port is one of identified in said routing instructions as said routing path and identified within said routing table as said routing path for all of said data transfers including a transfer of said second data set to said destination.

15. A method as in claim 13 wherein each of said interconnect devices includes an arbitration system wherein an arbiter manages flows of routing requests occurring in said communication network including said first routing request and said second routing request.

16. A method as in claim 12 wherein said destination includes a plurality of destinations and said second routing request is a multicast routing request, said multicast routing request requesting a plurality of port accesses to route said second data set to said plurality of destinations.

17. A method as in claim 1 wherein each of said first interconnect device and said second interconnect device includes a plurality of communication ports, each of said plurality of communication ports to perform at least one of data sending, data receiving, and route requesting for said data transfers including a transfer of said first data set to said destination.

18. A method as in claim 17 further including:

causing said first routing request to request a port access to a first communication port present in said first interconnect device to route said first data set from said processor to said second interconnect device wherein said second interconnect device including a second communication port to receive said first data set.

19. A method as in claim 17 wherein said destination includes a plurality of routing path identifications wherein each of said plurality of routing path identifications indicates at least one of said plurality of communication ports for said data transfers.

20. A method as in claim 19 wherein said second interconnect device further includes a routing table, said routing table including a routing path information for an address to said destination wherein said routing path information indicates a routing path for said data transfers including a transfer of said first data set to said destination.

21. A method as in claim 20 wherein said routing table is at least one of a unicast routing table and a multicast routing table, said unicast routing table being dedicated to routing said first data set to said destination and said multicast routing table being dedicated to routing said first data set to a plurality of said destinations.

22. A method as in claim 20 wherein said routing path information for said address is extracted from said routing table.

23. A method as in claim 22 wherein said routing table further indicates a port association for said address, said port association indicating at least one communication port dedicated to said data transfers including a transfer of said first data set to said destination.

24. A method as in claim 1 wherein said first interconnect device further includes an internal management port, said internal management port receives management instructions from a plurality of managers of said communication network, at least one of said plurality of managers performs at least one of managing and configuring said communication network, discovering and configuring interconnect devices in said communication network, and setting up, modifying, and configuring routing tables in said communication network.

25. A method as in claim 24 further including dividing said communication network into a plurality of Sub-Networks, each of said Sub-Networks interconnected to said communication network via connectors.

26. A method as in claim 25 wherein said plurality of managers includes Sub-Network managers and Sub-Network management agents.

27. A method as in as in claim 26 wherein each of said Sub-Networks includes at least one of said Sub-Network managers and at least one of said Sub-Network management agents.

28. A method as in claim 27 wherein at least one of said Sub-Network managers resides within one of said Sub-Networks and wherein at least one of said Sub-Network managers resides within said processor.

29. A method as in claim 28 including causing said processor to perform at least one of running said Sub-Network managers, running said Sub-Network management agents, disabling said Sub-Network management agents, managing said Sub-Network, and generating said first routing request, said first routing requests having no association to said routing instructions.

30. A method of facilitating data transfers through a communication network, said method including:
   forwarding a first data set received from a first interconnect device to a processor, said first data set having transfer instructions and routing instructions associating therewith, said routing instructions specifying a destination for said first data set;
   extracting said transfer instructions at said processor;
   generating a first routing request for said first data set according to said transfer instructions, said first routing request having no association to said routing instructions; and
   transferring said first data set to a second interconnect device capable of routing said first data set to said destination.

31. A method as in claim 30 wherein said second interconnect device is the same as said first interconnect device.

32. A computer readable storage medium containing executable computer program instructions which when executed cause a digital processing to perform a method for facilitating data transfers through a communication network, said method including:
   forwarding a first data set received from a first interconnect device to a processor, said first data set having transfer instructions and routing instructions associating therewith, said routing instructions specifying a destination for said first data set;
   extracting said transfer instructions at said processor;
   generating a first routing request for said first data set according to said transfer instructions, said first routing request having no association to said routing instructions; and
   transferring said first data set to a second interconnect device capable of routing said first data set to said destination.

33. A device including:
   a processor; and
   an interconnect device having a plurality of communication ports and an internal management port, said internal management port further coupling to said processor, and said interconnect device to receive a first data set and to forward said first data set to said processor, said first data set having transfer instructions and routing instructions associating therewith and said routing instructions specifying said destination for said first data set; and
   wherein said processor is coupled to an interface in said interconnect device such that said processor is capable of extracting said transfer instructions and generating a first routing request for said first data set according to said transfer instructions to transfer said first data set to another interconnect device capable of routing said first data set to said destination, said first routing request having no association to said routing instructions.

34. A device as in claim 33 wherein said interconnect device is the same as said another interconnect device.

35. A device as in claim 33 wherein said interconnect device further includes a manager, said manager capable of receiving said transfer instructions and generating said first routing request.

36. A device as in claim 33 wherein said interconnect device is coupled to said another interconnect device using a plurality of links wherein each of said plurality of links is one of a 1×link, a 4×link, and a 12×link.

37. A device as in claim 33 wherein said interconnect device is one of an ASIC chip, a switch, a router, a repeater, and an adapter.

38. A device as in claim 33 wherein said processor is a microprocessor.

39. A device as in claim 33 wherein said interconnect device is a switch configured for incorporation into a switch fabric.

40. A device as in claim 33 wherein said interconnect device is configured for incorporation into a communication network, said communication network performing data transfers.

41. A device as in claim 33 wherein said processor is further capable of generating a second data set and routing said second data set to said another interconnect device wherein said second data set is substantially identical to said first data set except that said second data set does not have said transfer instructions associated therewith and wherein said another interconnect device includes a routing table having a routing path to route said second data set to said destination.

42. A device as in claim 33 wherein each of said plurality of communication ports to perform at least one of data sending, data receiving, and route requesting for data transfers in and out of said interconnect device.

43. A device as in claim 33 wherein said first routing request requesting a port access to one of said plurality of communication ports to route said first data set from said processor to said another interconnect device wherein said another interconnect device includes at least one communication port to received said first data set.

44. As device as in claim 33 wherein said interconnect device further includes an internal management port, said internal management port coupling to said processor and said internal management port receiving management instructions from a plurality of managers of said communication network.

45. As device as in claim 33 wherein said interconnect device further includes an arbitration system wherein an arbiter manages flows of routing requests occurring in said interconnect device including said first routing request.

46. A device as in claim 33 wherein said transfer instructions are addressed to said processor instructing said processor to generate said first routing request.

47. A device as in claim 33 wherein said transfer instructions are addressed to said manager instructing said manager to generate said first routing request, said manager further residing in said processor.

48. A device as in claim 33 wherein said routing instructions further indicate a routing path for said data transfers including a transfer of said first data set to said destination.

49. A device as in claim 33 wherein said routing instructions further indicate a communication port sequence and a pointer for said communication port sequence wherein said pointer is an output port identifying a communication port dedicated to said data transfers including a transfer of said first data set to said destination, said communication port to perform at least one of data sending, data receiving, and route requesting.

50. A device as in claim 49 wherein said routing instructions further indicate an address for said destination such that address identifies said destination.

51. A computer readable storage medium containing executable computer program instructions which when executed cause a digital processing to perform a method for facilitating data transfers through a communication network, said method including:
forwarding a first data set received from a first interconnect device to a processor, said first data set having transfer instructions and routing instructions associated therewith, said routing instructions specifying a destination for said first data set;
extracting said transfer instructions at said processor; and
generating a first routing request for said first data set according to said transfer instructions to transfer said first data set to a second interconnect device capable of routing said first data set to said destination, said first routing request having no association to said routing instructions.

52. A computer readable storage medium as in claim 51 wherein said transfer instructions are addressed to said processor instructing said processor to generate said first routing request.

53. A computer readable storage medium as in claim 51 wherein said transfer instructions are addressed to a manager residing in said processor instructing said manager to generate said first routing request.

54. A computer readable storage medium as in claim 51 wherein said routing instructions further indicate a routing path for said data transfers including a transfer of said first data set to said destination.

55. A computer readable storage medium as in claim 51 wherein said routing instructions further indicate a communication port sequence and a pointer for said communication port sequence wherein said pointer is an output port identifying a communication port dedicated to said data transfers including a transfer of said first data set to said destination, said communication port configured to perform at least one of data sending, data receiving, and route requesting.

56. A computer readable storage medium as in claim 51 wherein said routing instructions further indicate at least one address for said destination such that said at least one address identifies said destination.

57. A computer readable storage medium containing executable computer program instructions which when executed cause a digital processing to perform a method for facilitating data transfers through a communication network, said method including:
forwarding a first data set received from a first interconnect device to a processor, said first data set having transfer instructions and routing instructions associated therewith, said routing instructions specifying a destination for said first data set;
extracting said transfer instructions at said processor;
generating a first routing request for said first data set according to said transfer instructions, said first routing request having no association to said routing instructions; and
transferring said first data set to a second interconnect device capable of routing said first data set to said destination.

58. A method as in claim 57 wherein said transfer instructions are addressed to said processor instructing said processor to generate said first routing request.

59. A method as in claim 57 wherein said transfer instructions are addressed to a manager residing in said processor instructing said manager to generate said first routing request.

60. A method as in claim 57 wherein said routing instructions further indicate a routing path for said data transfers including a transfer of said first data set to said destination.

61. A method as in claim 57 wherein said routing instructions further indicate a communication port sequence and a pointer for said communication port sequence wherein said pointer is an output port identifying a communication port dedicated to said data transfers including a transfer of said first data set to said destination, said communication port configured to perform at least one of data sending, data receiving, and route requesting.

62. A method as in claim 57 wherein said routing instructions further indicate an address for said destination such that said address identifies said destination.

63. A system to facilitate data transfers through a communication network, the system including:
a data forwarding process to cause a first data set received from a first interconnect device to be forwarded to a processor, said first data set having transfer instructions and routing instructions associated therewith, said routing instructions specifying a destination for said first data set;
an extraction process to cause said transfer instructions to be extracted at said processor; and
a request generation process to have said processor to generate a first routing request for said first data set according to said transfer instructions to transfer said first data set to a second interconnect device capable of routing said first data set to said destination, said first routing request having no association to said routing instructions.

64. A system according to claim 63 wherein said transfer instructions are addressed to said processor instructing said processor to generate said first routing request.

65. A system according to claim 63 wherein said transfer instructions are addressed to a manager residing in said processor instructing said manager to generate said first routing request.

66. A system according to claim 63 wherein said routing instructions further indicate a routing path for said data transfers including a transfer of said first data set to said destination.

67. A system according to claim 63 wherein said routing instructions further indicate a communication port sequence and a pointer for said communication port sequence wherein said pointer is an output port identifying a communication port dedicated to said data transfers including a transfer of said first data set to said destination, said communication port configured to perform at least one of data sending, data receiving, and route requesting.

68. A system according to claim 63 wherein said routing instructions further indicate an address for said destination such that said address identifies said destination.

69. A system to facilitate data transfers through a communication network, the system including:

a first means for causing a first data set received from a first interconnect device to be forwarded to a processor, said first data set having transfer instructions and routing instructions associated therewith, said routing instructions specifying a destination for said first data set;

a second means for causing said transfer instructions to be extracted at said processor; and a third means for generating a first routing request for said first data set according to said transfer instructions at said processor to transfer said first data set to a second interconnect device capable of routing said first data set to said destination, said first routing request having no association to said routing instructions.

70. A system as in claim 69 wherein said transfer instructions are addressed to said processor instructing said processor to generate said first routing request.

71. A system as in claim 69 wherein said transfer instructions are addressed to a manager residing in said processor instructing said manager to generate said first routing request.

72. A system as in claim 69 wherein said routing instructions further indicate a routing path for said data transfers including a transfer of said first data set to said destination.

73. A system as in claim 69 wherein said routing instructions further indicate a communication port sequence and a pointer for said communication port sequence wherein said pointer is an output port identifying a communication port dedicated to said data transfers including a transfer of said first data set to said destination, said communication port configured to perform at least one of data sending, data receiving, and route requesting.

74. A system as in claim 69 wherein said routing instructions further indicate an address for said destination such that said address identifies said destination.

75. A system to facilitate data transfers through a communication network, said system including:

a first means for forwarding a first data set received from a first interconnect device to a processor, said first data set having transfer instructions and routing instructions associated therewith, said routing instructions specifying a destination for said first data set;

a second means for extracting said transfer instructions at said processor, a third means for generating a first routing request for said first data set according to said transfer instructions, said first routing request having no association to said routing instructions; and a fourth means for transferring said first data set to a second interconnect device capable of routing said first data set to said destination.

76. A system to data transfers through a communication network, the system including:

a data forwarding process to cause a first data set received from a first interconnect device to be forwarded to a processor, said first data set having transfer instructions and routing instructions associated therewith, said routing instructions specifying a destination for said first data set;

an extraction process to cause said transfer instructions to be extracted at said processor;

a request generation process to have said processor to generate a first routing request for said first data set according to said transfer instructions, said first routing request having no association to said routing instructions; and a transfer process for transferring said first data set to a second interconnect device capable of routing said first data set to said destination.

* * * * *